(12) United States Patent
Sugihara et al.

(10) Patent No.: US 11,775,175 B2
(45) Date of Patent: Oct. 3, 2023

(54) STORAGE SYSTEM, STORAGE MANAGEMENT METHOD, AND STORAGE MANAGEMENT PROGRAM

(71) Applicant: HITACHI, LTD., Tokyo (JP)

(72) Inventors: Kahori Sugihara, Tokyo (JP); Takahiro Yamamoto, Tokyo (JP); Toshiya Seki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 80 days.

(21) Appl. No.: 17/688,347

(22) Filed: Mar. 7, 2022

(65) Prior Publication Data

US 2023/0083242 A1    Mar. 16, 2023

(30) Foreign Application Priority Data

Sep. 10, 2021    (JP) .................................. 2021-147785

(51) Int. Cl.
*G06F 3/06* (2006.01)

(52) U.S. Cl.
CPC .......... *G06F 3/0613* (2013.01); *G06F 3/0604* (2013.01); *G06F 3/0659* (2013.01); *G06F 3/0679* (2013.01)

(58) Field of Classification Search
CPC .... G06F 3/0613; G06F 3/0604; G06F 3/0659; G06F 3/0679; G06F 3/0608; G06F 3/061; G06F 3/0685; Y02D 10/00
See application file for complete search history.

(56) References Cited

U.S. PATENT DOCUMENTS

| | | | | |
|---|---|---|---|---|
| 6,035,379 A | * | 3/2000 | Raju | G06F 9/466 714/E11.131 |
| 10,417,190 B1 | * | 9/2019 | Donlan | G06F 16/128 |
| 2007/0101182 A1 | | 5/2007 | Takahashi et al. | |
| 2015/0277805 A1 | * | 10/2015 | Cheng | G06F 3/0604 711/154 |
| 2020/0326855 A1 | * | 10/2020 | Wu | G06F 3/0659 |

FOREIGN PATENT DOCUMENTS

JP    2007-122476 A    5/2007

* cited by examiner

*Primary Examiner* — Francisco A Grullon
(74) *Attorney, Agent, or Firm* — Volpe Koenig

(57) ABSTRACT

An amount of writing data to storage devices can be kept low in additional processing for solving the write hole problem. A storage system includes a computer(s), a non-volatile storage device(s), and a high-speed storage device (s) which can be accessed at a higher speed than the above-mentioned storage device(s), and a drive log including write log information is recorded in the high-speed storage device. When the computer receives a write request for write data, the computer firstly performs drive log check processing and then performs data write processing. In the drive log check processing, if a redundant write log record is recorded in a drive log, the computer changes the write log status of the redundant write log record to "completed" by targeting at the drive log and the write log information and then proceeds to the data write processing; and if the redundant write log record is not recorded in the drive log, the computer proceeds to the data write processing without changing the drive log or the write log information.

7 Claims, 22 Drawing Sheets

FIG. 4

| # | WRITE LOG RESOURCE NUMBER | DRIVE NUMBER | OFFSET POSITION |
|---|---|---|---|
| 1 | R1 | D2 | 493820 |
| 2 | R2 | D0 | 339725 |
| 3 | R3 | D3 | 564809 |

WRITE LOG RESOURCE TABLE (81), 811, 813, 812

FIG. 5

| # | WRITE LOG RESOURCE NUMBER |
|---|---|
| 1 | 0 |
| 2 | 48 |
| 3 | 20 |
| 4 | 54 |

WRITE LOG RESOURCE QUEUE (82)

FIG. 6

DRIVE LOG TABLE ~83

| # | DRIVE NUMBER (831) | WRITE LOG RESOURCE NUMBER (832) | WRITE LOG INFORMATION (833) | | HASH VALUE (834) |
|---|---|---|---|---|---|
| | | | TRANSACTION NUMBER | .. | |
| 1 | D1 | R1-1 | T503 | .. | 3204, 2304, 2390 |
| 2 | D2 | R2-5 | .. | .. | 5402, 3298, 5400 |
| 3 | D3 | R3-4 | .. | .. | 239, 2304, 8970 |
| 4 | D4 | R4-2 | .. | .. | 843, 597, 9575 |

FIG. 7

WRITE LOG INFORMATION ~85

| # | TRANSACTION NUMBER (841) | CHUNK GROUP NUMBER (842) | OFFSET POSITION (843) | I/O LENGTH (844) | WRITE LOG STATUS (845) | DATA (846) |
|---|---|---|---|---|---|---|
| 1 | T503 | C4 | 0 | 4 | START | NEW DATA |
| 2 | T634 | C3 | 1024 | 128 | START | NEW DATA |
| 3 | T1203 | C2 | 512 | 32 | START | NEW DATA |
| 4 | T205 | C0 | 256 | 512 | START | NEW DATA |
| 5 | T31 | C2 | 520 | 16 | COMPLETED | NEW DATA |
| 6 | T0 | C1 | 32 | 8 | START | NEW DATA |

FIG. 8

| | HASH TABLE | | 84 |
|---|---|---|---|
| # | HASH VALUE | DRIVE LOG NUMBER | |
| 1 | 3204 | L1 | |
| 2 | 2304 | L1,L3 | |
| 3 | 2390 | L1 | |
| 4 | 5402 | L2 | |

STORAGE SYSTEM, STORAGE MANAGEMENT METHOD, AND STORAGE MANAGEMENT PROGRAM

TECHNICAL FIELD

The present invention relates to a storage system, a storage management method, and a storage management program.

BACKGROUND ART

The RAID technology which enhances reliability and availability of storage devices has been being widely used. A set of data and parity cannot be updated completely simultaneously in a plurality of storage devices which constitute a RAID, so that if power shutdown or failure occurs in a transient state of writing data, the data will not be written normally and the storage devices will enter a state where the data and the parity do not match each other. Consequently, it becomes impossible to recover the data and this problem is known as a "write hole problem." PTL 1 discloses, as one example of a countermeasure against the write hole problem, a data storage system including a plurality of disk storage devices for storing data and a storage controller that is connected to the plurality of disk storage devices via transmission paths and performs access control of the disk storage devices in accordance with an access instruction from a host, wherein the storage controller includes: a memory that stores write data pertaining to write commands; and a controller that updates an ID value for each of the write commands, insert the ID value to some or all pieces of the write data, and writes the data to disks of the disk storage devices; and wherein in response to a completion of writing data to the disk storage device, the controller: reads some or all pieces of the write data from the disk storage device to which writing the data has been completed; stores the read data in the memory; and detects any write omission in the disk storage device by comparing the ID value in the read data with the inserted ID value.

CITATION LIST

Patent Literature

PTL 1: Japanese Patent Application Laid-Open (Kokai) Publication No. 2007-122476

SUMMARY OF THE INVENTION

Problems to be Solved by the Invention

The invention described in PTL 1 requires steps of assigning the ID value and collation with respect to each write command and its corresponding write data, so that an enormous load is imposed on the system and there is still room for improvement as the countermeasure against the write hole problem.

Means to Solve the Problems

A storage system according to a first aspect of the present invention is a storage system comprising a computer, a nonvolatile storage device, and a high-speed storage device which can be accessed at a higher speed than the storage device, wherein in each of the storage devices, a storage area is divided into a user area for storing user data and a meta area for storing write log information regarding writing of data to the user data; wherein the write log information includes a plurality of write log records, each of which is a combination of a write range of the user data in the user area and a write log status; wherein the write log status indicates at least either "start" indicating that writing data starts or "completed" indicating that writing data is completed; wherein a drive log including the write log information is recorded in the high-speed storage device; wherein when receiving a write request for write data, the computer specifies a scheduled write range which is a range of the user area to write the write data and firstly executes drive log check processing and then executes data write processing; wherein in the drive log check processing, if a redundant write log record which is the write log record having a write range that at least partly overlaps with the scheduled write range is recorded in the drive log, the computer changes the write log status of the redundant write log record to "completed" by targeting at the drive log and the write log information and then proceeds to the data write processing; and if the redundant write log record is not recorded in the drive log, the computer proceeds to the data write processing without changing the drive log and the write log information; wherein in the data write processing, the computer writes the scheduled write range and the write log record, in which the write log status is "start," to the write log information and the drive log and then writes the write data to the scheduled write range; and wherein the computer does not change the write log status, which is combined with the scheduled write range, to "completed" as processing attributable to the reception of the write request for the write data.

A storage management method according to a second aspect of the present invention is a storage management method executed by a processor in a storage system comprising the processor, a nonvolatile storage device, and a high-speed storage device which can be accessed at a higher speed than the storage device, wherein in each of the storage devices, a storage area is divided into a user area for storing user data and a meta area for storing write log information regarding writing of data to the user data wherein the write log information includes a plurality of write log records, each of which is a combination of a write range of the user data in the user area and a write log status; wherein the write log status indicates at least either "start" indicating that writing data starts or "completed" indicating that writing data is completed; wherein a drive log including the write log information is recorded in the high-speed storage device; wherein the storage management method includes, when receiving a write request for write data, causing the processor to specify a scheduled write range which is a range of the user area to write the write data and firstly execute drive log check processing and then execute data write processing; wherein in the drive log check processing, if a redundant write log record which is the write log record having a write range that at least partly overlaps with the scheduled write range is recorded in the drive log, the processor changes the write log status of the redundant write log record to "completed" by targeting at the drive log and the write log information and then proceeds to the data write processing; and if the redundant write log record is not recorded in the drive log, the processor proceeds to the data write processing without changing the drive log and the write log information; wherein in the data write processing, the processor writes the scheduled write range and the write log record, in which the write log status is "start," to the write log information and the drive log and then writes the write data to the scheduled write range; and wherein the processor does not change the write log status, which is combined with the scheduled write range, to "completed" as processing attributable to the reception of the write request for the write data.

A storage management program according to a third aspect of the present invention is a storage management program executed in a storage system comprising a processor, a nonvolatile storage device, and a high-speed storage device which can be accessed at a higher speed than the storage device, wherein in each of the storage devices, a storage area is divided into a user area for storing user data and a meta area for storing write log information regarding writing of data to the user data; wherein the write log information includes a plurality of write log records, each of which is a combination of a write range of the user data in the user area and a write log status; wherein the write log status indicates at least either "start" indicating that writing data starts or "completed" indicating that writing data is completed; wherein a drive log including the write log information is recorded in the high-speed storage device; wherein the storage management program includes, when the storage system receives a write request for write data, causing the processor to specify a scheduled write range which is a range of the user area to write the write data and firstly execute drive log check processing and then execute data write processing; wherein in the drive log check processing, if a redundant write log record which is the write log record having a write range that at least partly overlaps with the scheduled write range is recorded in the drive log, the processor is caused to change the write log status of the redundant write log record to "completed" by targeting at the drive log and the write log information and then proceed to the data write processing; and if the redundant write log record is not recorded in the drive log, the processor is caused to proceed to the data write processing without changing the drive log and the write log information; wherein in the data write processing, the processor is caused to write the scheduled write range and the write log record, in which the write log status is "start," to the write log information and the drive log and then write the write data to the scheduled write range; and wherein the processor is not caused to change the write log status, which is combined with the scheduled write range, to "completed" as processing attributable to the reception of the write request for the write data.

Advantageous Effects of the Invention

According to the present invention, number of writing data to the storage devices can be reduced in additional processing for solving the write hole problem.

BRIEF DESCRIPTION OF DRAWINGS

FIG. 4 is a diagram illustrating one example of a write log resource table;
FIG. 5 is a diagram illustrating one example of a write log resource queue;
FIG. 6 is a diagram illustrating one example of a drive log table;
FIG. 7 is a diagram illustrating one example of write log information;
FIG. 8 is a diagram illustrating one example of a hash table.

DESCRIPTION OF EMBODIMENTS

First Embodiment

A first embodiment of a storage system according to the present invention will be explained below with reference to FIG. 1 to FIG. 24.

Figure 1:
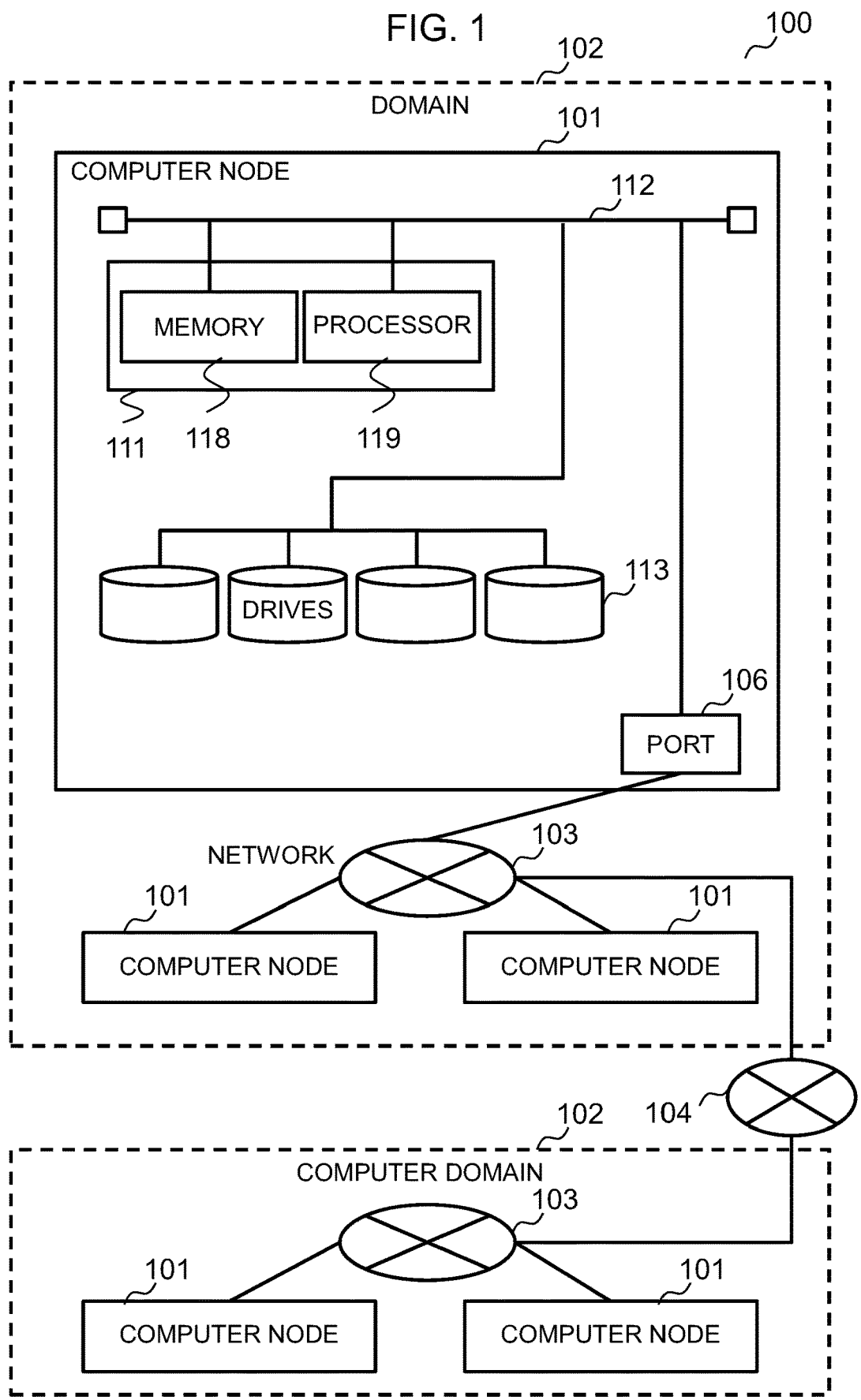
FIG. 1 is an overall configuration diagram of a storage system.

FIG. 1 is an overall configuration diagram of a storage system 100. A computer node 101 has the configuration of, for example, a common server computer. A hardware configuration of the computer node 101 is not particularly limited. A computer node 101 connects to another computer node 101 through a port 106 via a network 103. The network 103 is configured by, for example, InfiniBand or Ethernet.

A plurality of computer nodes 101 forms a domain 102. The domain 102 may be associated with, for example, a geographical area or may be associated with a topology of a virtual or physical network 103. A network 104 (external network) connects a plurality of domains 102. Each of the computer nodes 101 connects the port 106, a processor package 111, and a plurality of disk drives (hereinafter sometimes referred to as "drives") 113 via an internal network 112. The processor package 111 includes a memory 118 and a processor 119. The processor 119 is, for example, a central processing unit.

The memory 118 stores necessary control information for a processor 119 to process read and write commands and execute a storage function, and also stores cache data for storage. Moreover, the memory 118 stores, for example, programs to be executed by the processor 119. For example, a volatile DRAM or a nonvolatile SCM (Storage Class Memory) may be used as the memory 118.

The drive 113 is configured by, for example, hard disk drives, SSDs (Solid State Drives), and so on having interfaces such as FC (Fiber Channel), SAS (Serial Attached SCSI), and SATA (Serial Advanced Technology Attachment). An SCM such as NAND, PRAM, and ReRAM may be used or a volatile memory may be used as the drive 113. When the volatile memory is used, the storage device may be made nonvolatile by using a battery. Since the memory 118 can be accessed at a higher speed than the drive 113, the memory 118 can be called a "high-speed storage device."

Figure 2:
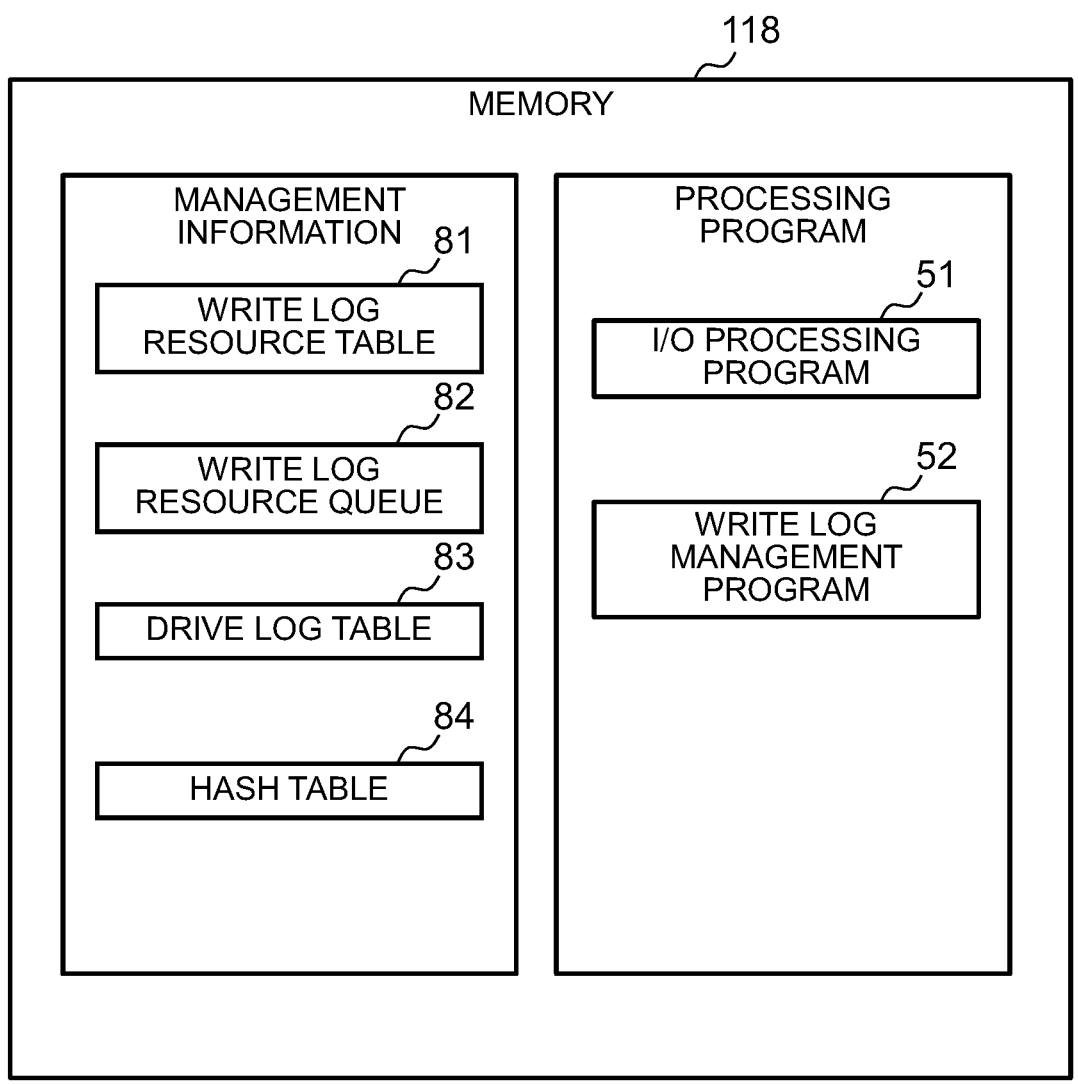
FIG. 2 is a diagram illustrating information for controlling the storage system.

FIG. 2 is a diagram illustrating information for controlling the storage system 100. The memory 118 stores, in addition to the information indicated in FIG. 2, various kinds of programs including a storage program for implementing the storage function, an OS, and an interface program. The memory 118 may further stores application programs for carrying out work. The memory 118 stores, as management information, a write log resource table 81, a write log resource queue 82, a drive log table 83, and a hash table 84. The memory 118 further stores, as processing programs, an I/O processing program 51 and a write log management program 52. Furthermore, the memory 118 stores a host controller program for controlling transmission and reception of I/O requests and responses to them to/from a host apparatus via the networks 104, 103.

The write log resource table 81 records a recording position of a write log in the drive. The write log resource queue 82 stores an index number of the write log resource table 81 in a queue structure. When the write log management program 52 accesses a write log area in the drive, the index number is acquired from the write log resource queue 82, its write log resource is temporarily is occupied, and the recording position of the write log corresponding to this index number is accessed. Consequently, a plurality of processing is prevented from simultaneously accessing the same write log information in the drive. The number of write log resources possessed by each computer node 101 needs to be equal to or more than the maximum simultaneous I/O quantity defined for the storage system 100, more precisely, the maximum simultaneous write quantity. The number of the write log resources possessed by each computer node 101 is, for example, twice as large as the maximum simultaneous I/O quantity for the storage system 100.

The drive log table 83 records write log information 85 which is recorded in all the drives 113 stored in the same computer node 101. The write log information 85 will be explained later. The hash table 84 is a hash table for checking duplications in the user area at a high speed. The hash table 84 uses a map using an offset of the user area as a key. Incidentally, the drive log table 83 may be sometimes called a "drive log." A conceptual diagram of the drives 113 will be explained before explaining the outlines of the I/O processing program 51 and the write log management program 52.

Figure 3:
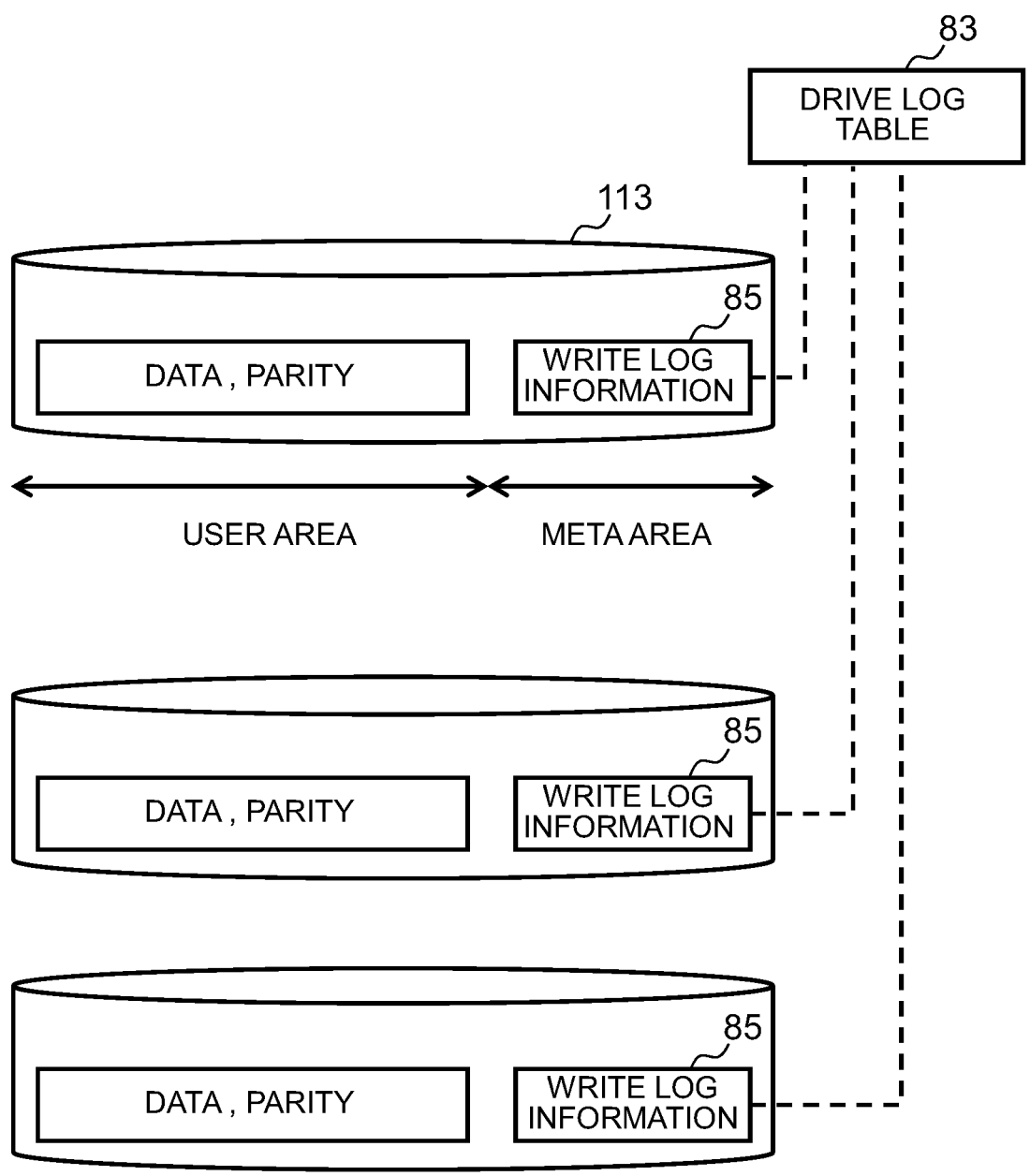
FIG. 3 is a conceptual diagram of drives.

FIG. 3 is a conceptual diagram of the drives 113. Each of the drives 113 included in the computer node 101 is divided into a user area and a meta area. In this embodiment, a boundary between the user area and the meta area is fixed. However, that boundary may be different in each drive 113. Protection target data and parity for redundancy are written to the user area. In this embodiment, the data and the parity are the same in order to protect the data by means of mirroring. The write log information 85 is written to the meta area. The drive log table 83 which is stored in the memory 118 for the computer node 101 includes the write log information 85 of all the drives 113 included in that computer node 101 as mentioned above.

An update of the write log information 85 of each drive and an update of the drive log table 83 are conducted almost simultaneously as described later. The reason why the same information is written at two positions in the same computer node 101 is because it is desirable to read the write log information 85 at a high speed. Specifically speaking, as compared to an operation cycle of the processor 119, it requires very long time to read information from the drive 113; however, it takes shorter time than the drive 113 to read information from the memory 118. The explanation will continue referring back to FIG. 2.

The I/O processing program 51 performs I/O processing when receiving an I/O request from the host controller. Specifically, the I/O processing program 51 updates the write log information 85 in the meta area and the drive log table 83 in the memory 118 with respect to the write log management program 52 and the I/O processing program 51 updates the data or the parity in the user area by itself. Furthermore, the I/O processing program 51 issues an instruction to the I/O processing program 51 of other node to save the same data for the protection of the data. In this embodiment, the computer node 101 which receives the I/O request from the host controller will be referred to as a data node DN and a node(s) which receives the instruction from the I/O processing program(s) 51 of the other computer node(s) 101 to save the data will be referred to as a parity node(s) PN. However, the data node DN and the parity node PN are distinguished from each other for the sake of convenience and the computer node 101 which operates as the data node DN in certain processing may operate as the parity node PN in another processing.

The write log management program 52 performs processing described below when receiving the instruction from the I/O processing program 51. The write log management program 52 receives information of the user area to which the I/O processing program 51 is about to write data, for example, information about a starting address of a write area and an area with write data length, from and as designated by the I/O processing program 51. The write log management program 52 refers to the drive log table 83 and checks whether a write log of an area overlapping with the range of the user area to which the I/O processing program 51 is about to write data exists or not. If the write log of the overlapping area remains, the write log management program 52 causes the write log to make the transition from a starting state to a completed state. Then, the write log management program 52 acquires a resource for accessing the write log information 85 recorded in the meta area in the drive 113 from the write log resource table 81 and updates the write log information 85. Furthermore, the write log management program 52 updates the drive log table 83 in the memory so that the information of the updated write log information 85 will be included.

FIG. 4 is a diagram illustrating one example of the write log resource table 81. The write log resource table 81 records a recording position(s) of a write log(s) in each drive 113. The write log resource table 81 is configured from a plurality of records and each record includes a write log resource number 811, a drive number 813, and an offset position 812. The write log resource number 811 is an identifier of the relevant write log resource. The drive number 813 is an identifier of the relevant drive 113 in which the write log is recorded. The offset position 812 indicates the position at which the write log is recorded and is an offset volume from a leading area of the drive 113 or an offset volume from a leading area of the meta area. In the example illustrated in FIG. 4, the write log resource table 81 shows only three records, but actually it has the same number of records as the number of write log resources. The number of the write log resources is identical to the total number of write logs stored in the meta area of each drive 113.

FIG. 5 is a diagram illustrating one example of the write log resource queue 82. The write log resource queue 82 stores the index numbers of the write log resource table 81 in a queue structure. When accessing a write log area in the drive, the index number is acquired from the write log resource queue 82 and the recording position of the write log corresponding to this index number is accessed, so that the control can be performed to prevent the access to the same write log information from a plurality of processing.

FIG. 6 is a diagram illustrating one example of the drive log table 83. The drive log table 83 stores the write log information 85 of all the drives 113 included in the same computer node, and additional information. The drive log table 83 is configured from a plurality of records and each record includes a drive number 831, a write log resource number 832, write log information 833, and a hash value 834. Each record is generated in relation to writing data to the user area of any one of the drives 113 (which will be referred to as "target writing" in the explanation of FIG. 6), or is updated. Incidentally, in FIG. 6, the drive log table 83 shows only four records, but actually includes a large number of records.

The drive number 831 is an identifier for identifying a target drive 113 of the target writing. The write log resource number 832 is an identifier of a write log resource used for the target writing. The write log information 833 is information of a write log related to the target writing and is the same as one record of the write log information 85 recorded in the drive 113 identified by the drive number 831. The details of the write log information 833 are omitted in FIG. 6, but the configuration of the write log information 833 is the same as that of the write log information 85 illustrated in FIG. 7. The hash value 834 is a hash value for checking duplications of the user area in the target writing at a high speed. Each record of the drive log table 83 is overwritten when the target writing of the same drive number 831 or the same write log resource number 832 is conducted.

FIG. 7 is a diagram illustrating one example of the write log information 85. The write log information is stored in the meta area of the drive 113 and the same information is also included in the drive log table 83. The write log information 85 is configured from a plurality of records and each record includes fields of a transaction number 841, a chunk group number 842, an offset position 843, an I/O length 844, a write log status 845, and data 846. Each record is generated in relation to writing data to the user area of any one of the drives 113 (which will be referred to as "target writing" in the explanation of FIG. 7), or is updated. Incidentally, each record of the write log information 85 will be hereinafter also referred to as a "write log record."

The transaction number 841 is a serial number of I/O processing. The chunk group number 842 is an identifier of a chunk group used for the target writing. The offset position 843 is an address of the user area to which the target writing is performed. The I/O length 844 is the length of writing in the target writing. The write log status 845 is either "start" indicating that the target writing starts or "completed" indicating that the target writing is completed. The write log status 845 is used to refer to the status of the write log which remains at the time of, for example, recovery from a shutdown or failure of the power source for the storage system and judge whether to make each data/parity return to the state before the I/O processing or the state after the I/O processing. Consequently, it becomes easy to make generations of the data match each other between the computer nodes. The data 846 stores data itself which is written to the user area in the target writing. The number of records in the write log information 85 is the same as the quantity of the write log resources.

FIG. 8 is a diagram illustrating one example of the hash table 84. The hash table 84 is a hash table for searching the drive log table 83 at a high speed. The hash table 84 stores a plurality of sets of a combination of a hash value and a drive log number. The hash value is calculated based on the address of the user area to which writing data is performed, in other words, based on the offset position 843 in the hash table 84. The drive log number indicates an index number (#) in the drive log table 83.

(Flowcharts)

Figure 9:
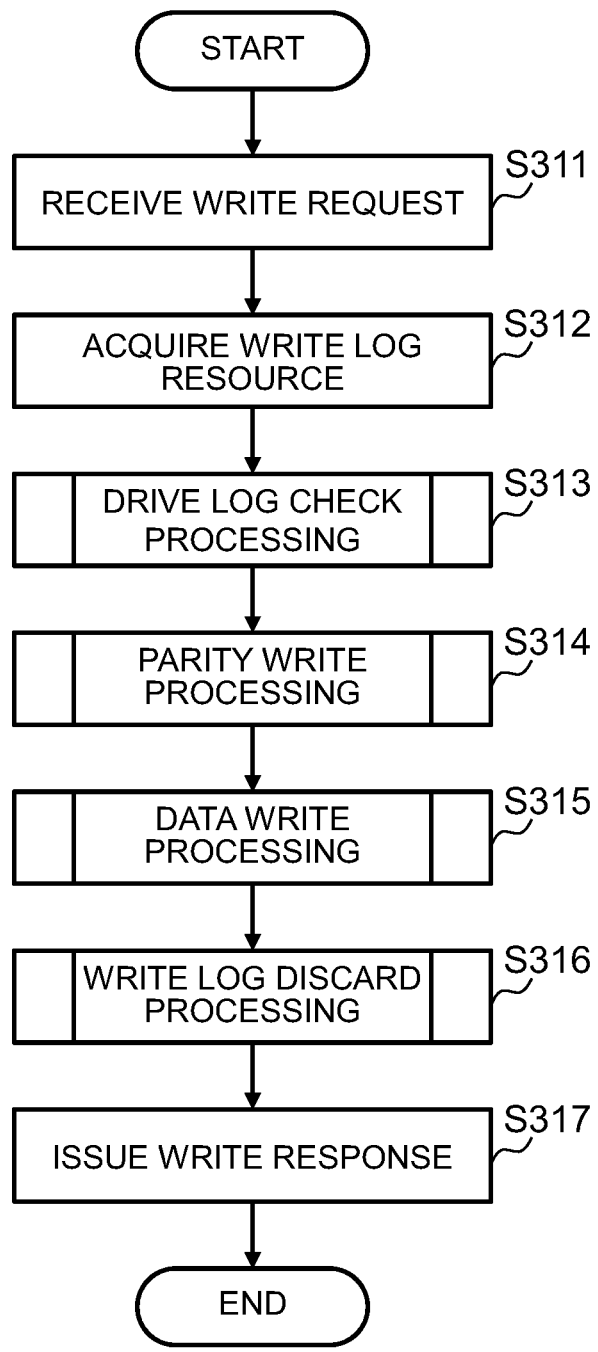
FIG. 9 is a flowchart illustrating operations when the storage system receives a write request from host controller.

Operations of the storage system 100 will be explained by using flowcharts with reference to FIG. 9 to FIG. 13. FIG. 9 is a flowchart illustrating the operations of the storage system 100 when it receives a write request from the host controller. However, in the following explanation, data to be written as requested from the host controller will be hereinafter referred to as "write data" and the range of the user area to which the write data is to be written will be referred to as a "scheduled write range." The scheduled write range of the data node DN and the scheduled write range of the parity node PN do not often match each other.

Referring to FIG. 9, firstly in step S311, the I/O processing program 51 of the data node DN receives a write request for the write data and specifies the drive 113 to write the write data and the range of the user area to write the write data. In the next step S312, the write log management program 52 acquires the write log resource. In the subsequent step S313, drive log check processing is executed by targeting at the write data at the data node DN. The details of this processing will be explained later with reference to FIG. 10. In the next step S314, parity write processing is executed. The details of this processing will be explained later with reference to FIG. 11. In the subsequent step S315, data write processing is executed. The details of this processing will be explained later with reference to FIG. 12. In the next step S316, write log discard processing is executed. The details of this processing will be explained later with reference to FIG. 13. In the subsequent step S317, the I/O processing program 51 issues a write response to the host controller and terminates the processing illustrated in FIG. 9.

Figure 10:
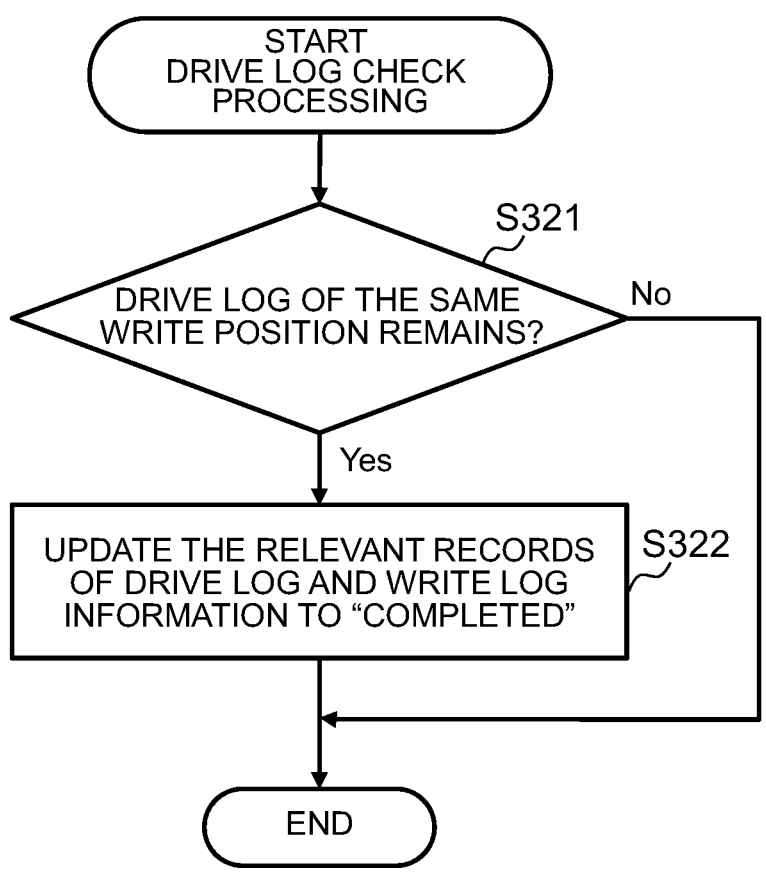
FIG. 10 is a flowchart illustrating the details of drive log check processing.

FIG. 10 is a flowchart illustrating the details of the drive log check processing. In FIG. 10, firstly in step S321, the write log management program 52 judges whether the drive log of the same write position remains or not. Under this circumstance, a write log record having the designated drive 113 and a write range which partly overlaps with the scheduled write range will be referred to as a "redundant write log record." In this case, in step S321, specifically, whether this redundant write log record is recorded in the drive log table 83 or not is judged.

If the write log management program 52 determines that the redundant write log record is included in the drive log table 83, it proceeds to step S332; and if it determines that the redundant write log record is not included in the drive log table 83, it terminates the processing illustrated in FIG. 10. In step S322, the write log management program 52 updates the write log status of the redundant write log record in the drive log table 83 and the write log information 85 to "completed" and terminates the processing illustrated in FIG. 10. The processing illustrated in FIG. 10 has been explained above.

Figure 11:
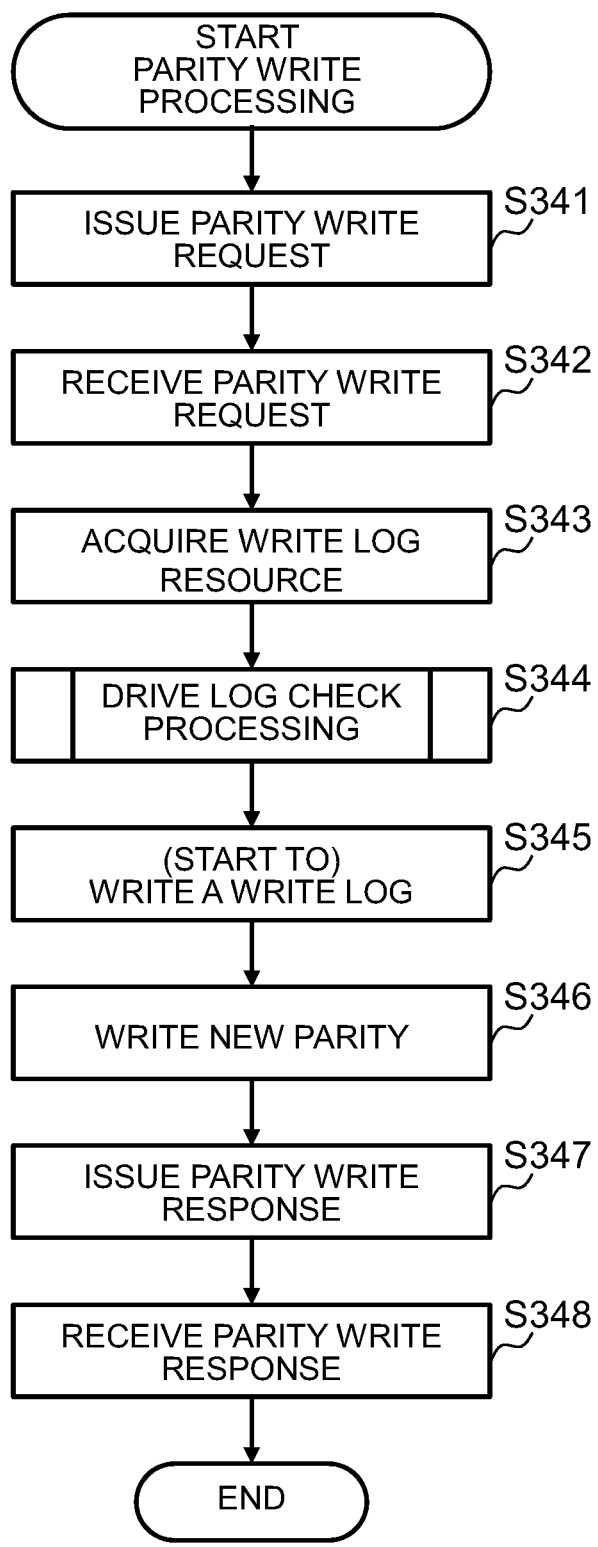
FIG. 11 is a flowchart illustrating the details of parity write processing.

FIG. 11 is a flowchart illustrating the details of the parity write processing. In FIG. 11, firstly in step S341, the I/O processing program 51 of the data node DN issues a parity write request to the I/O processing program 51 of the parity node PN; and in the next step S342, the I/O processing program 51 of the parity node PN receives the parity write request. The parity write request includes the write data which the data node DN received from the host controller. However, in the following explanation, this write data handled by the parity node PN will be referred to as "parity" or "parity data." When this happens, the I/O processing program 51 of the parity node PN specifies the drive 113 to write the parity data and the range of the user area to write the parity data.

In the next step S343, the write log management program 52 of the parity node PN acquires the write log resource; and in the subsequent step S344, the drive log check processing is performed by targeting at the parity data in the parity node PN. The details of the drive log check processing are as explained with reference to FIG. 10. However, since at least the writing position is different from that of the drive log check processing in step S313, the judgment content may possibly become different.

In the next step S345, the write log management program 52 of the parity node PN records a write log indicating that writing the parity data is to start, in the drive log table 83 and the write log information 85 of the drive 113 to write the parity data. Specifically speaking, this write log record indicates that the offset position 843 is the position to start writing of the parity data and the write log status 845 is "start." In the next step S346, the I/O processing program 51 of the parity node PN writes the parity data to the drive 113. In the subsequent step S347, the I/O processing program 51 of the parity node PN transmits a parity write response to the data node DN; and in the next step S348, the I/O processing program 51 of the data node DN receives this parity write response. The processing illustrated in FIG. 11 has been explained above.

Figure 12:
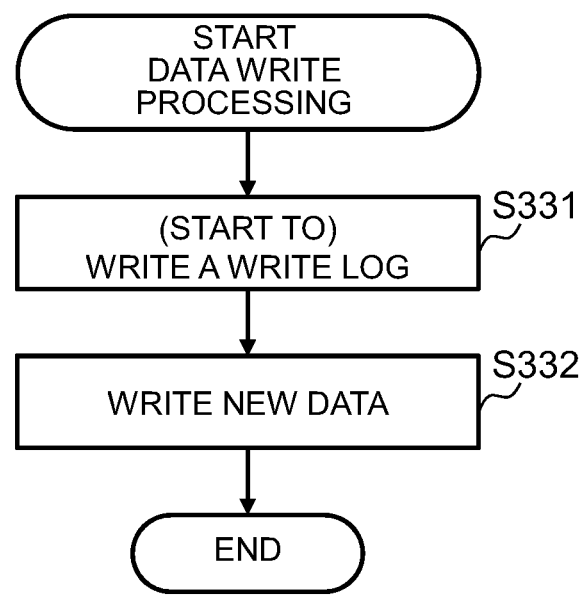
FIG. 12 is a flowchart illustrating the details of data write processing.

FIG. 12 is a flowchart illustrating the details of the data write processing. In FIG. 12, firstly in step S331, the write log management program 52 of the data node DN records a write log record indicating that writing of the write data is to start, in the drive log table 83 and the write log information 85 of the drive 113 to write the write data. Specifically speaking, this write log record indicates that the offset position 843 is the position to complete writing of the write data and the write log status 845 is "start." In the next step S346, the I/O processing program 51 of the data node DN writes the write data to the drive 113. The processing illustrated in FIG. 12 has been explained above.

Figure 13:
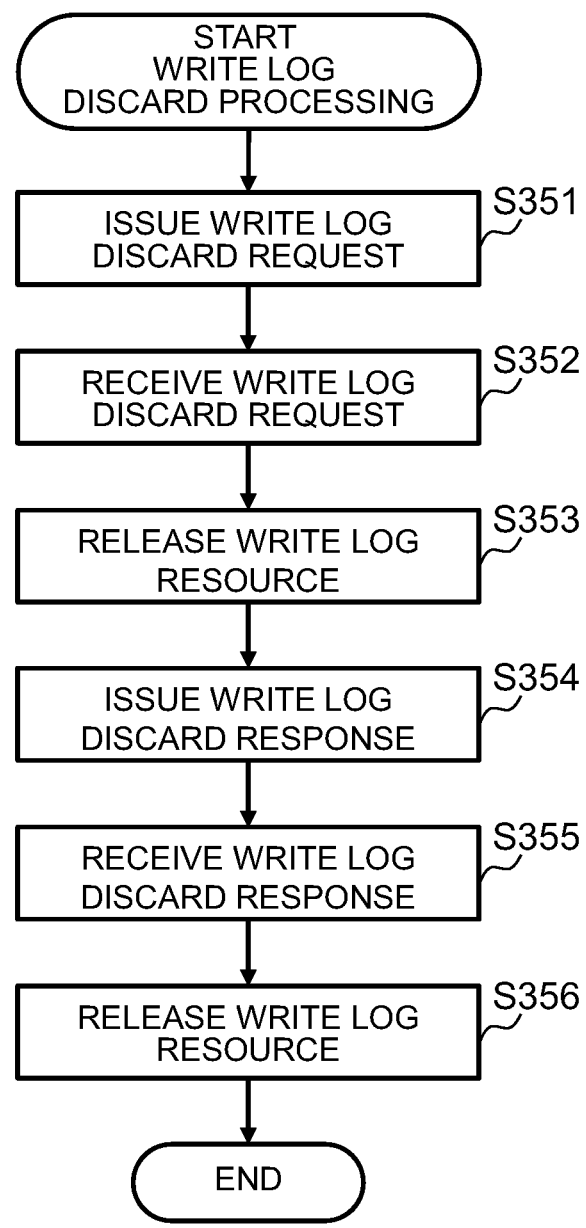
FIG. 13 is a flowchart illustrating the details of write log discard processing.

FIG. 13 is a flowchart illustrating the details of the write log discard processing. In FIG. 13, firstly in step S351, the I/O processing program 51 of the data node DN issues a write log discard request to the I/O processing program 51 of the parity node PN; and in the next step S352, the I/O processing program 51 of the parity node PN receives the write log discard request. In the subsequent step S353, the write log management program 52 of the parity node PN releases the write log resource; and in the next step S354, the I/O processing program 51 of the parity node PN transmits a write log discard response to the data node DN. In the subsequent step S355, the I/O processing program 51 of the data node DN receives the write log discard response; and in the next step S356, the write log management program 52 of the data node DN releases the write log resource and terminates the processing illustrated in FIG. 13.

(Configuration of Comparative Example)

Before explaining time charts of the details of the write log processing when writing data in the storage system according to this embodiment, the configuration and outline of a comparative example will be firstly explained. The comparative example is a distributed storage system in which data and a redundant code (erasure correction code) are distributed to, and stored in, a plurality of computer nodes, and the details of the configuration and operations are disclosed in, for example, Japanese Patent No. 6752149 and Japanese Patent No. 6547057.

Figure 14:
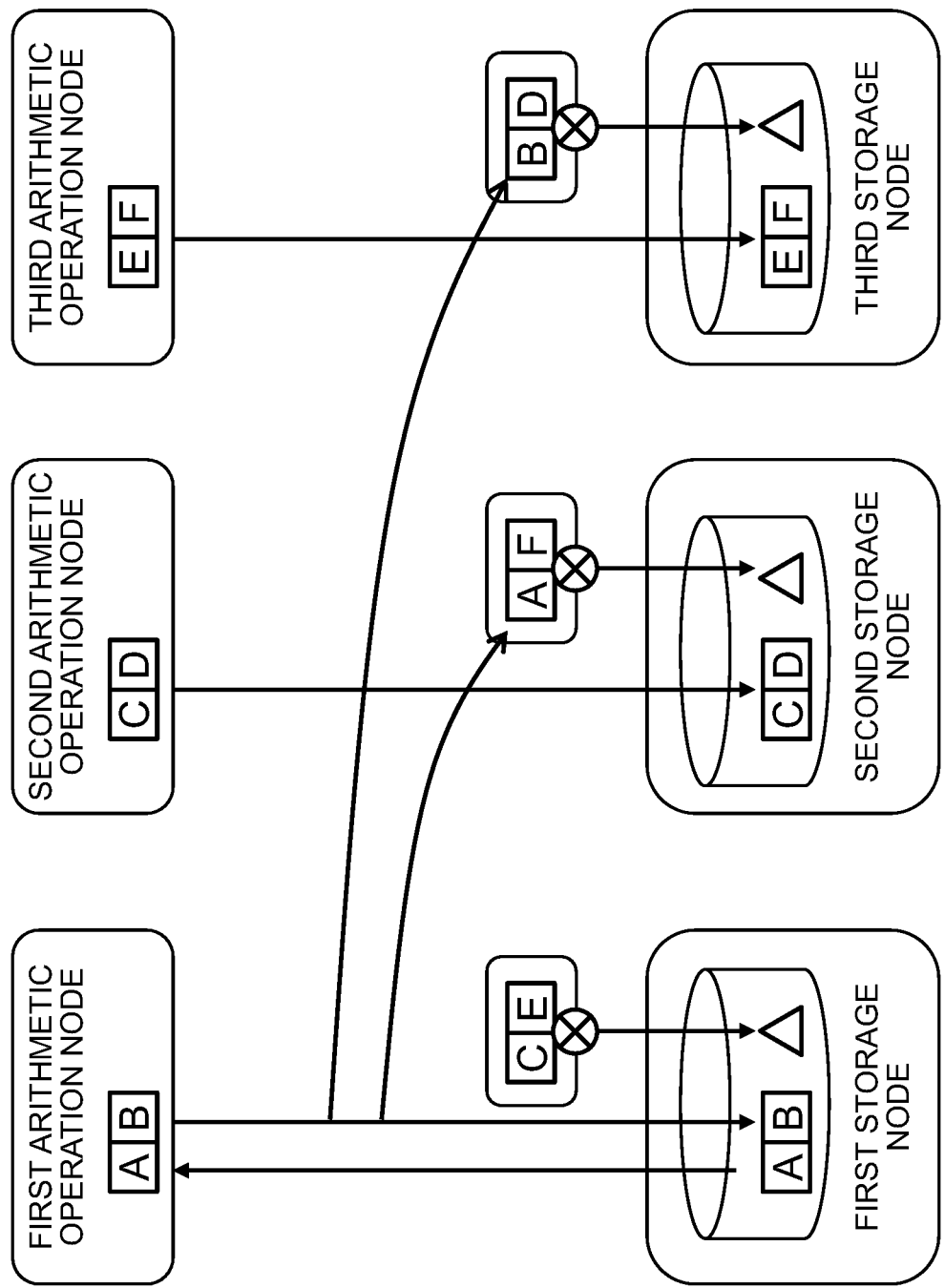
FIG. 14 is a conceptual diagram illustrating data protection by a comparative example.

FIG. 14 is a conceptual diagram illustrating data protection by the comparative example. FIG. 14 shows three computer nodes and three storage nodes. In FIG. 14, A to F surrounded with squares indicate data. The operations performed when the first computer node outputs A and B, the second computer node outputs C and D, and the third computer node outputs E and F are as explained below. The first storage node: saves A and B as they are; and further saves an erasure correction code of C and E. The second storage node: saves C and D as they are; and further saves an erasure correction code of A and F. The third storage node: saves E and F as they are; and further saves an erasure correction code of B and D. In this case, even if a failure occurs at any one of the storage nodes, all the data of A to E can be obtained as they are, or can be recovered and obtained. This method has the advantages of high storage capacity efficiency and high read performance from the storage node(s) at normal times.

Figure 15:
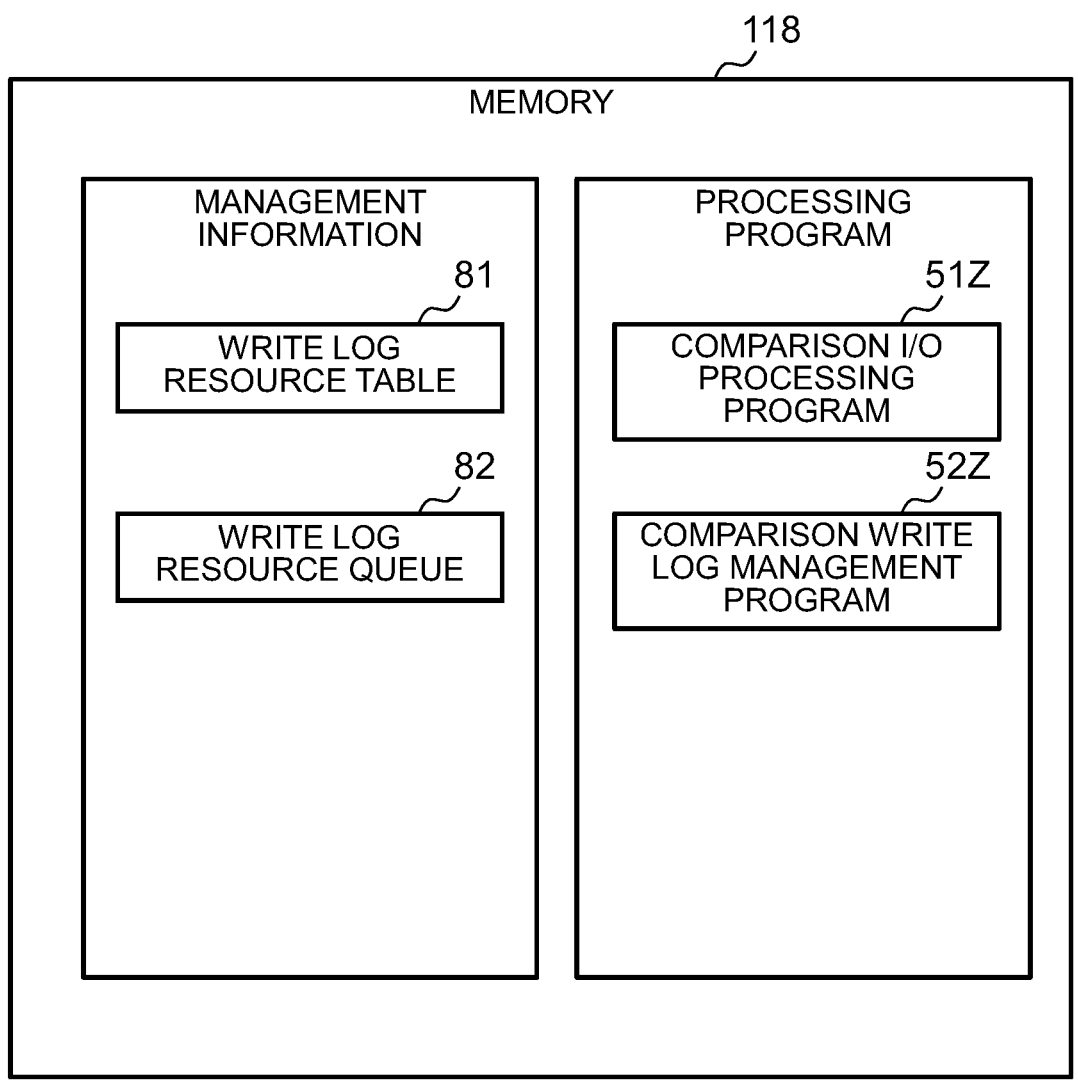
FIG. 15 is a diagram illustrating information for control of the comparative example.

FIG. 15 is a diagram illustrating information for controlling the comparative example. FIG. 15 is in a pair relation with FIG. 2 in this embodiment. The comparative example includes, as processing programs, a comparison I/O processing program 51Z which performs processing similar to the I/O processing program 51, and a comparison write log management program 52Z which performs processing similar to the write log management program 52. The comparative example includes, as management information, the write log resource table 81 and the write log resource queue 82 and does not include the drive log table 83 or the hash table 84.

(Time Charts of Comparative Example)

Figure 16:
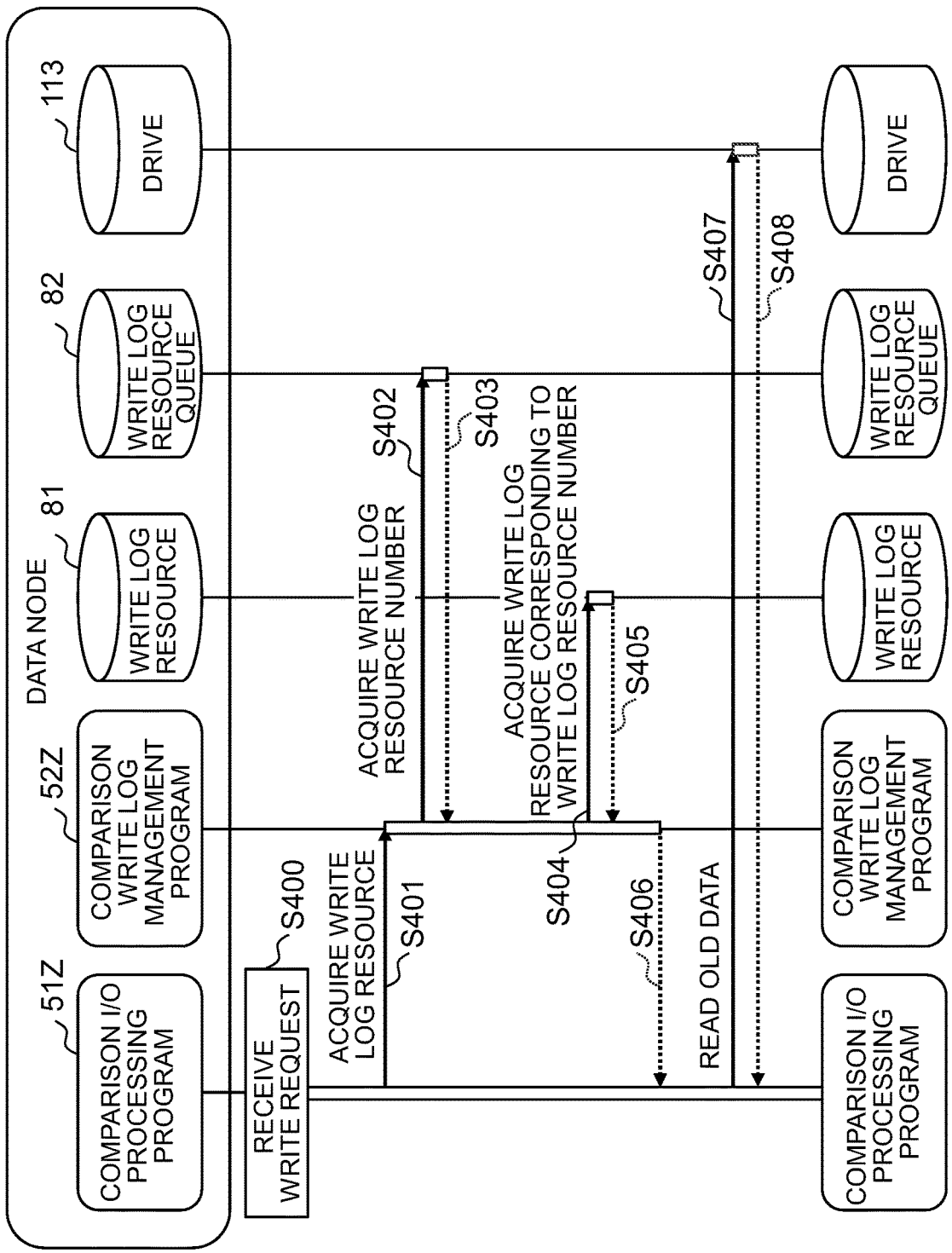
FIG. 16 is a first time chart illustrating processing of the comparative example.
Figure 17:
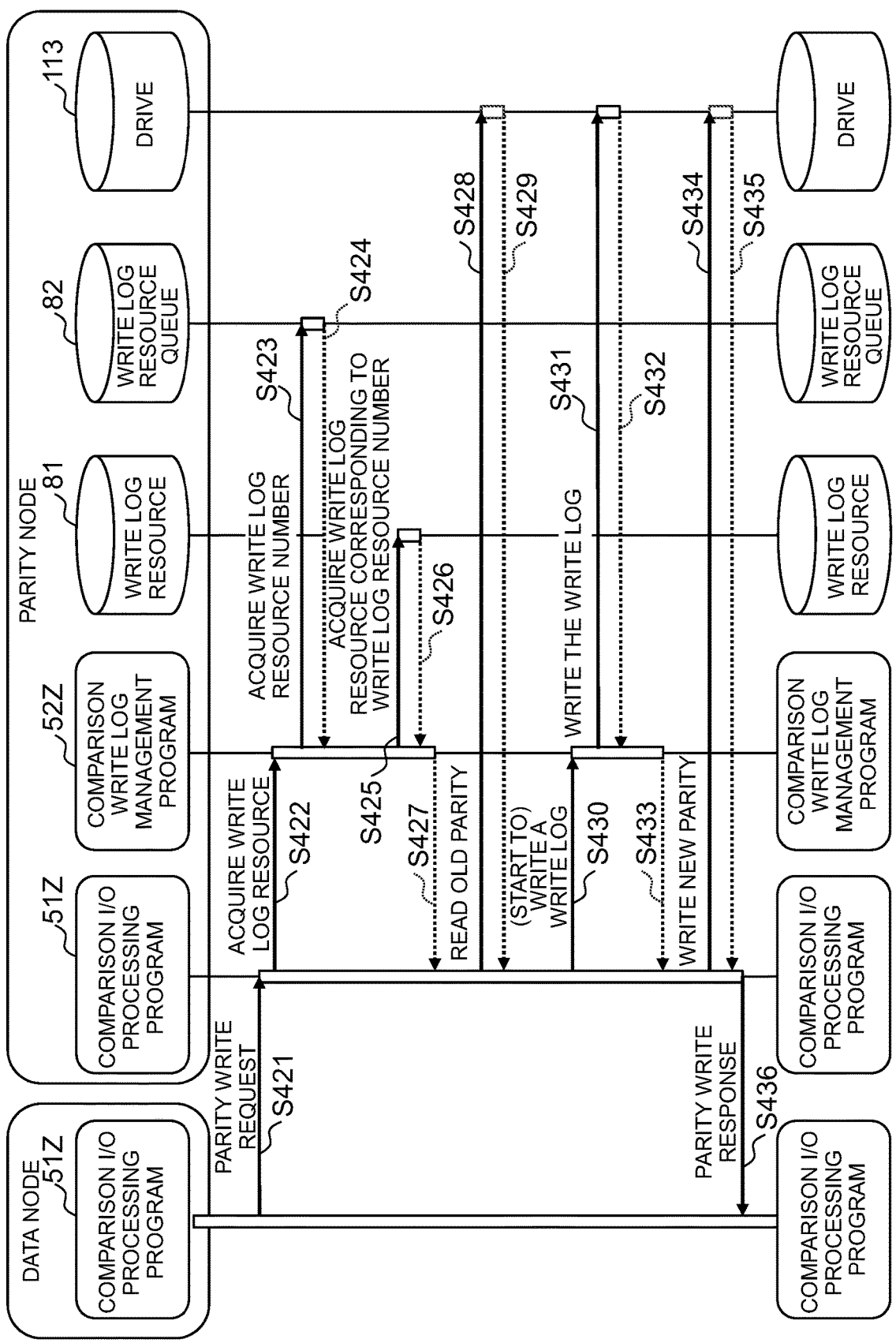
FIG. 17 is a second time chart illustrating the processing of the comparative example.
Figure 18:
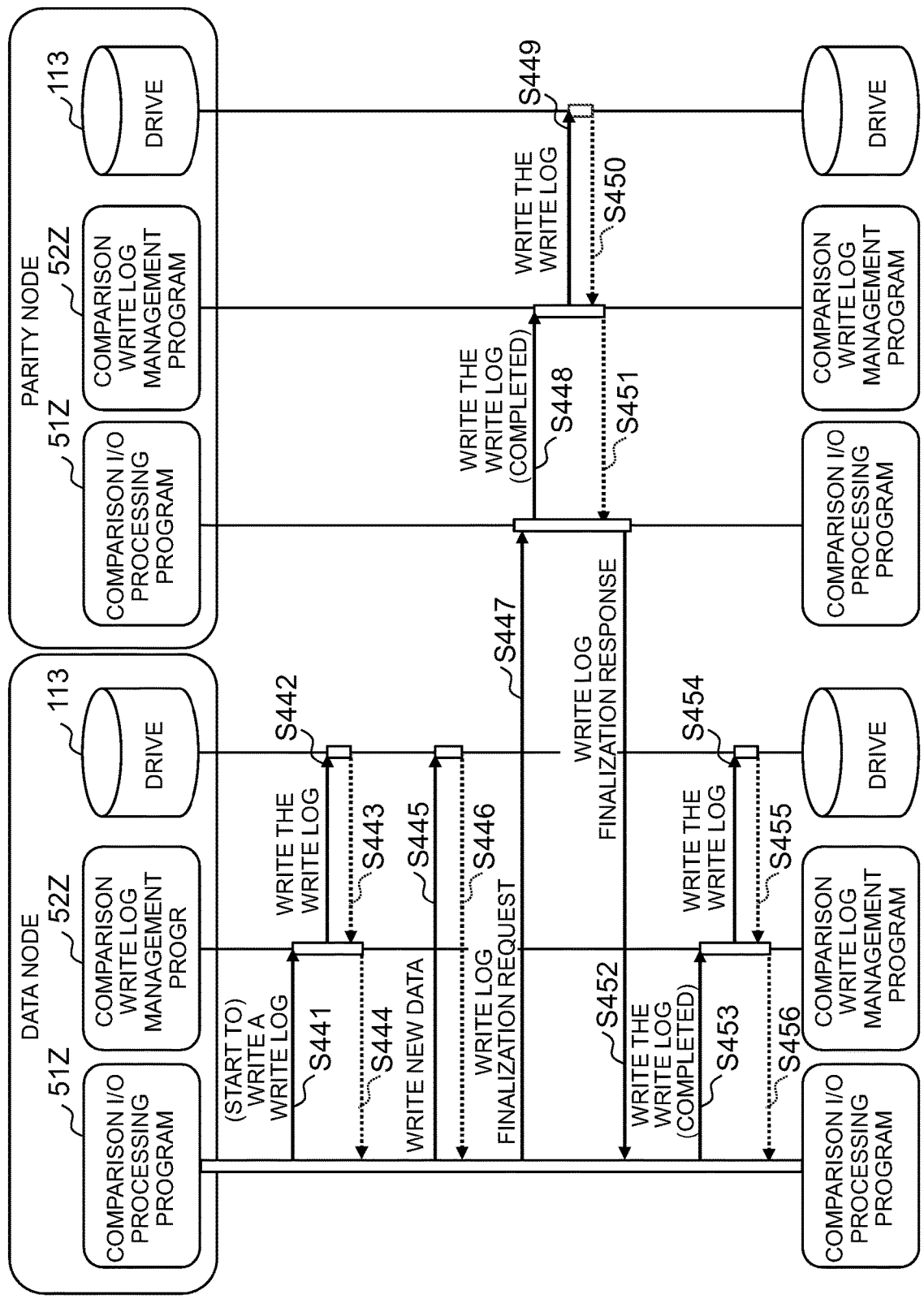
FIG. 18 is a third time chart illustrating the processing of the comparative example.
Figure 19:
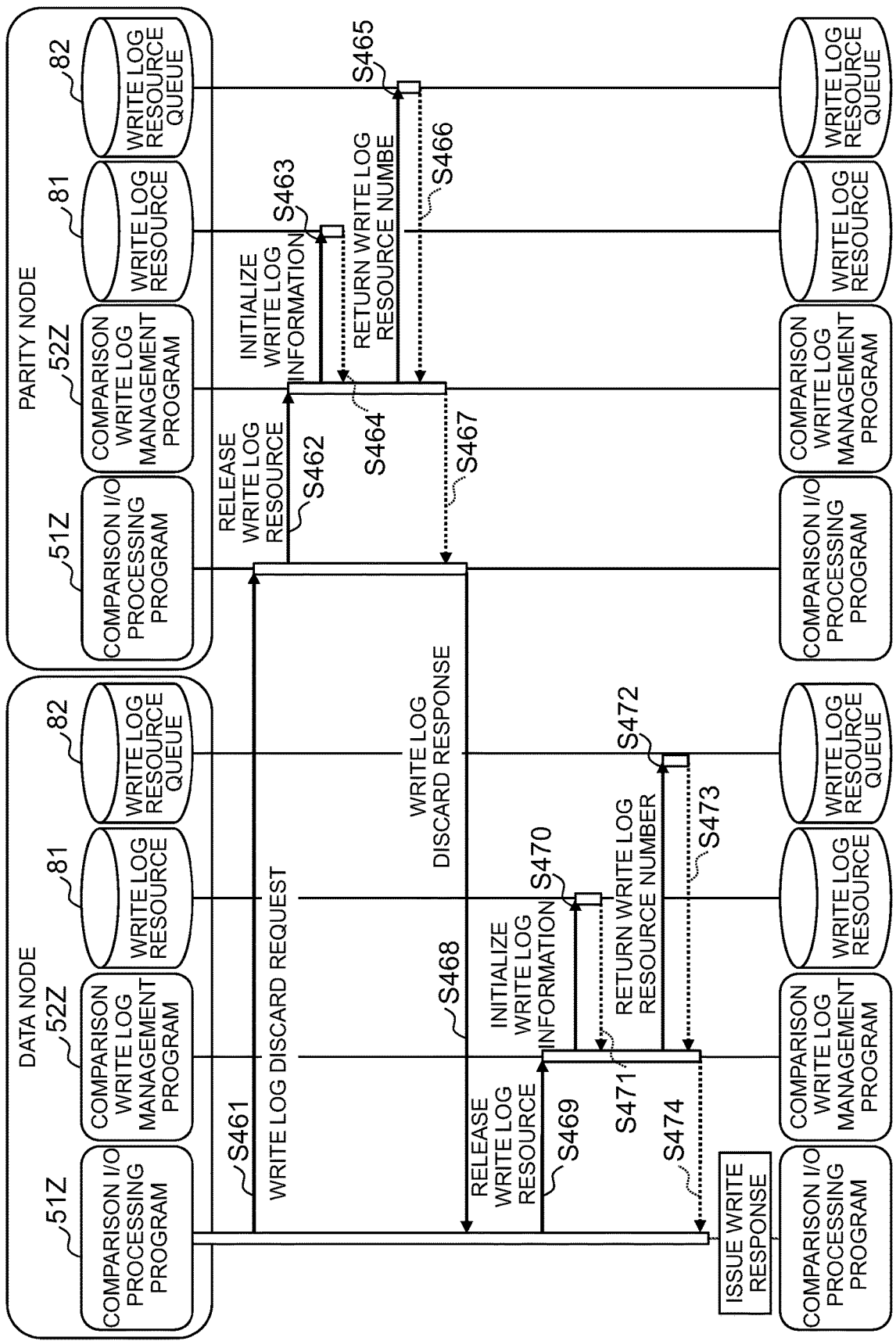
FIG. 19 is a fourth time chart illustrating the processing of the comparative example.

FIG. 16 to FIG. 19 are time charts illustrating a series of processing for writing data according to the comparative example. In each of FIG. 16 to FIG. 19, time passes from the top of the relevant drawing towards its bottom. The processing illustrated in FIG. 16 to FIG. 19 is chronologically successive in the sequential order of the drawings; and the processing illustrated in FIG. 16 is followed by the processing illustrated in FIG. 17, which is then followed by the processing illustrated in FIG. 18, and then finally the processing illustrated in FIG. 19 is performed. Moreover, serial step numbers starting from "S400" are assigned to the respective processing in FIG. 16 to FIG. 19. This step number with a larger numeric value indicates that the relevant processing is executed at a later time of day in the time series. Incidentally, in FIG. 16 to FIG. 19, the write log resource table 81 is described as the "write log resource" for the sake of designing the drawings. Furthermore, a computer node in which data is stored is described as a "data node"; and a computer node in which the erasure correction code corresponding to the relevant data is stored is described as a "parity node."

The entire processing illustrated in FIG. 16 is processing at the data node DN. Therefore, the description indicating that it is the configuration of the data node DN is omitted in the explanation of FIG. 16. The comparison I/O processing program 51Z firstly receives a write request from the host controller (S400). Next, the comparison I/O processing program 51Z issues an instruction to the comparison write log management program 52Z to acquire a write log resource (S401). Having received this instruction, the comparison write log management program 52Z accesses the write log resource queue 82 and acquires the write log resource number (S402). In FIG. 16, to acquire information from the write log resource queue 82 is expressed with a broken line arrow from the write log resource queue 82 to the comparison write log management program 52Z for the sake of convenience. Broken line arrows at other positions in FIG. 16 to FIG. 19 are similar descriptions for the sake of convenience. Next, the comparison write log management program 52Z accesses the write log resource table 81 and acquires the write log resource corresponding to the write log resource number acquired in S402 (S404, S405). Having acquired the write log resource, the comparison write log management program 52Z provides the acquired write log resource to the comparison I/O processing program 51Z (S406). Then, the comparison I/O processing program 51Z accesses the drive 113 and reads old data (S407, S408). The explanation will continue by referring to FIG. 17.

The comparison I/O processing program 51Z of the data node DN sends a parity write request to the comparison I/O processing program 51Z of the parity node PN (S421). Having received this request, the comparison I/O processing program 51Z issues an instruction to the comparison write log management program 52Z of the same parity node PN to acquire the write log resource (S422). Having received this instruction, the comparison write log management program 52Z accesses the write log resource queue 82 of the same parity node PN and acquires the write log resource number (S423, S424). Next, the comparison write log management program 52Z of the parity node PN accesses the write log resource table 81 and acquires the write log resource corresponding to the write log resource number acquired in S423 (S425, S426). After acquiring the write log resource, the comparison write log management program 52Z provides the acquired write log resource to the comparison I/O processing program 51Z (S427).

Then, the comparison I/O processing program 51Z of the parity node PN accesses the drive 113 and reads old parity data (erasure correction code) (S428, S429). Next, the comparison I/O processing program 51Z issues an instruction to the write log management program 52 to record a start write log indicating that writing is to be started (S430). The comparison write log management program 52Z writes the start write log to the drive 113 and receives a response indicating the completion of writing from the drive 113 (S431, S432). Next, once the writing of the start write log is completed normally, the comparison write log management program 52Z transmits a notice of the completion of writing of the start write log to the comparison I/O processing program 51Z of the parity node PN (S433). Having received the notice of the writing completion of the start write log, the comparison I/O processing program 51Z of the parity node PN writes new parity (erasure correction code) to the drive 113 and receives a response of writing completion from the drive 113 (S434, S435). Once the parity writing is completed normally, the comparison I/O processing program 51Z of the parity node PN transmits a parity write response indicating the completion of the parity writing to the comparison I/O processing program 51Z of the data node DN (S436). The explanation will continue by referring to FIG. 18.

Having received the parity write response from the parity node PN, the comparison I/O processing program 51Z of the data node DN issues a start write log, indicating that writing data to the drive 113 of the data node DN is to be started, to the comparison write log management program 52Z of the data node DN (S441). The comparison write log management program 52Z writes the write log to the drive 113 and receives a response indicating that the writing is completed, from the drive 113 (S442, S443). Next, once the writing of the start write log is completed normally, the comparison write log management program 52Z transmits a notice of writing completion of the start write log to the comparison I/O processing program 51Z of the data node DN (S444). Having received the notice of the writing completion of the start write log, the comparison I/O processing program 51Z of the data node DN writes new data to the drive 113 and receives a response indicating the completion of writing from the drive 113 (S445, S446). Once the writing of the new data is completed normally, the comparison I/O processing program 51Z of the data node DN issues an instruction to the comparison I/O processing program 51Z of the parity node PN to record a completion write log indicating the writing completion (S447). Incidentally, to issue the instruction to the parity node PN to record the completion write log will be hereinafter also referred to as a "write log finalization request."

Having received this instruction, the comparison I/O processing program 51Z of the parity node PN issues an instruction to the comparison write log management program 52Z to record the completion write log (S448). Having received this instruction, the comparison write log management program 52Z writes the completion write log to the drive 113 and receives a response indicating the completion of writing from the drive 113 (S449, S450). Once the writing of the completion write log is completed normally, the comparison write log management program 52Z of the parity node PN transmits a notice of writing completion of the completion write log to the comparison I/O processing program 51Z of the parity node PN (S451). Once the writing of the completion write log is completed normally, the comparison I/O processing program 51Z of the parity node PN transmits a write log finalization response indicating the writing completion of the completion write log to the comparison I/O processing program 51Z of the data node DN (S452).

Having received the write log finalization response from the parity node PN, the comparison I/O processing program 51Z of the data node DN issues an instruction to the comparison write log management program 52Z of the data node DN to record the completion write log indicating the completion of writing data to the drive 113 of the data node DN (S453). The comparison write log management program 52Z writes the completion write log to the drive 113 and receives a response indicating the writing completion from the drive 113 (S454, S455). Next, once the writing of the completion write log is completed normally, the comparison write log management program 52Z transmits a notice of the writing completion of the completion write log to the comparison I/O processing program 51Z of the data node DN (S456). The explanation will continue by referring to FIG. 19.

Having received the notice of the writing completion of the completion write log, the comparison I/O processing program 51Z of the data node DN sends a write log discard request to the comparison I/O processing program 51Z of the parity node PN (S461). Having received this request, the comparison I/O processing program 51Z of the parity node PN issues an instruction to the comparison write log management program 52Z of the same parity node PN to release the write log resource (S462). The comparison write log management program 52Z of the parity node PN initializes the write log information of the write log resource table 81 (S463, S464) and returns the write log resource number to the write log resource queue 82 (S465, S466). Once the return of the write log resource number is completed, the comparison write log management program 52Z of the parity node PN transmits a notice of completion of the write log resource release to the comparison I/O processing program 51Z of the same parity node PN (S467). Having received this transmitted notice, the comparison I/O processing program 51Z of the parity node PN transmits a write log discard response indicating the completion of discarding the write log to the comparison I/O processing program 51Z of the data node DN. Having received this transmitted notice, the comparison I/O processing program 51Z of the data node DN issues an instruction to the comparison write log management program 52Z of the same data node DN to release the write log resource (S469).

Having received this instruction, the comparison write log management program 52Z of the data node DN initializes the write log information of the write log resource table 81 (S470, S471) and returns the write log resource number to the write log resource queue 82 (S472, S473). Once the return of the write log resource number is completed, the comparison write log management program 52Z of the data node DN transmits a notice of the completion of the write log resource release to the comparison I/O processing program 51Z of the same data node DN (S474). Having received this transmitted notice, the comparison I/O processing program 51Z of the data node DN transmits a write response, which indicates that the processing in response to the write request received in S400 in FIG. 16 has been completed, to the host controller and terminates the series of data writing processing as illustrated in FIG. 16 to FIG. 19.

(Time Charts of Storage System According to Embodiment of the Present Invention)

FIG. 20 to FIG. 24 are time charts illustrating a series of processing for writing data according to this embodiment. In each of FIG. 20 to FIG. 24, time passes from the top of the relevant drawing towards its bottom. The processing illustrated in FIG. 20 to FIG. 24 is chronologically successive in the sequential order of the drawings. Also, serial step numbers starting from "S500" are assigned to the respective processing in FIG. 20 to FIG. 24. This step number with a larger numeric value indicates that the relevant processing is executed at a later time of day in the time series. Incidentally, in FIG. 20 to FIG. 24, the write log resource table 81 is described as the "write log resource" for the sake of designing the drawings. Furthermore, a computer node in which data is stored is described as a "data node"; and a computer node which is a mirroring destination of the relevant data is described as a "parity node." Differences from the series of processing by the MEC as illustrated in FIG. 16 to FIG. 19 will be mainly explained below.

Figure 20:
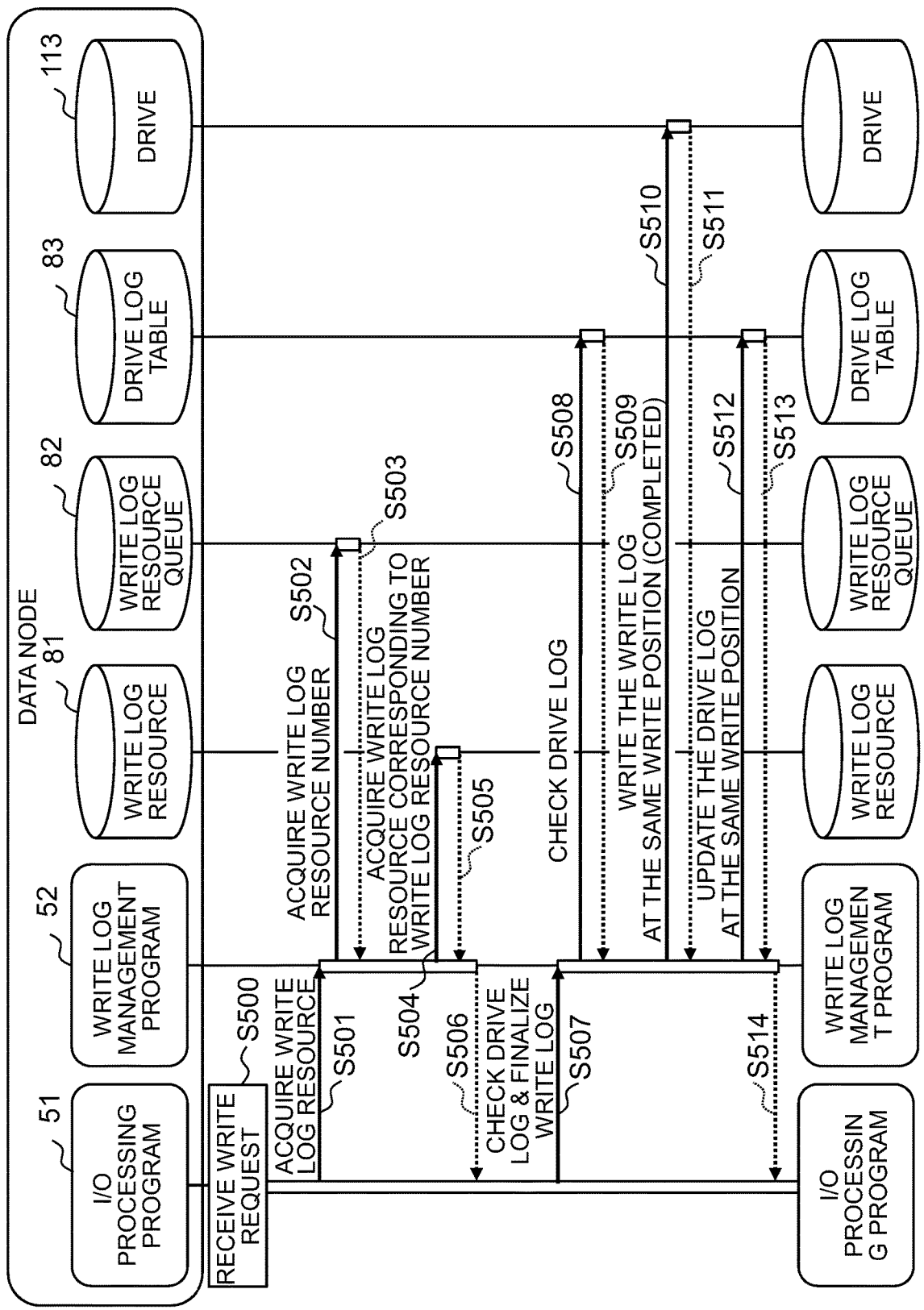
FIG. 20 is a first time chart illustrating processing of a first embodiment.
Figure 21:
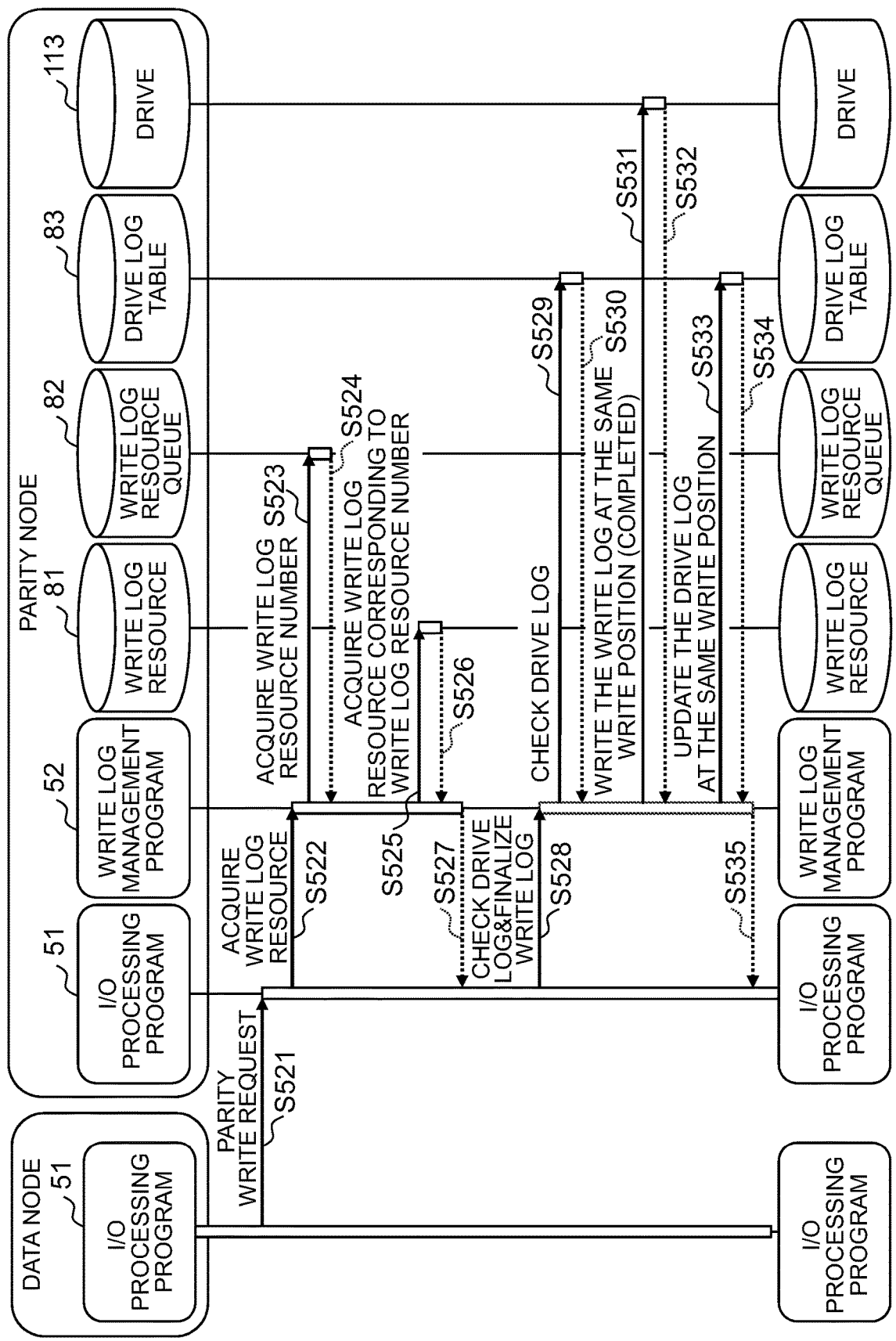
FIG. 21 is a second time chart illustrating the processing of the first embodiment.
Figure 22:
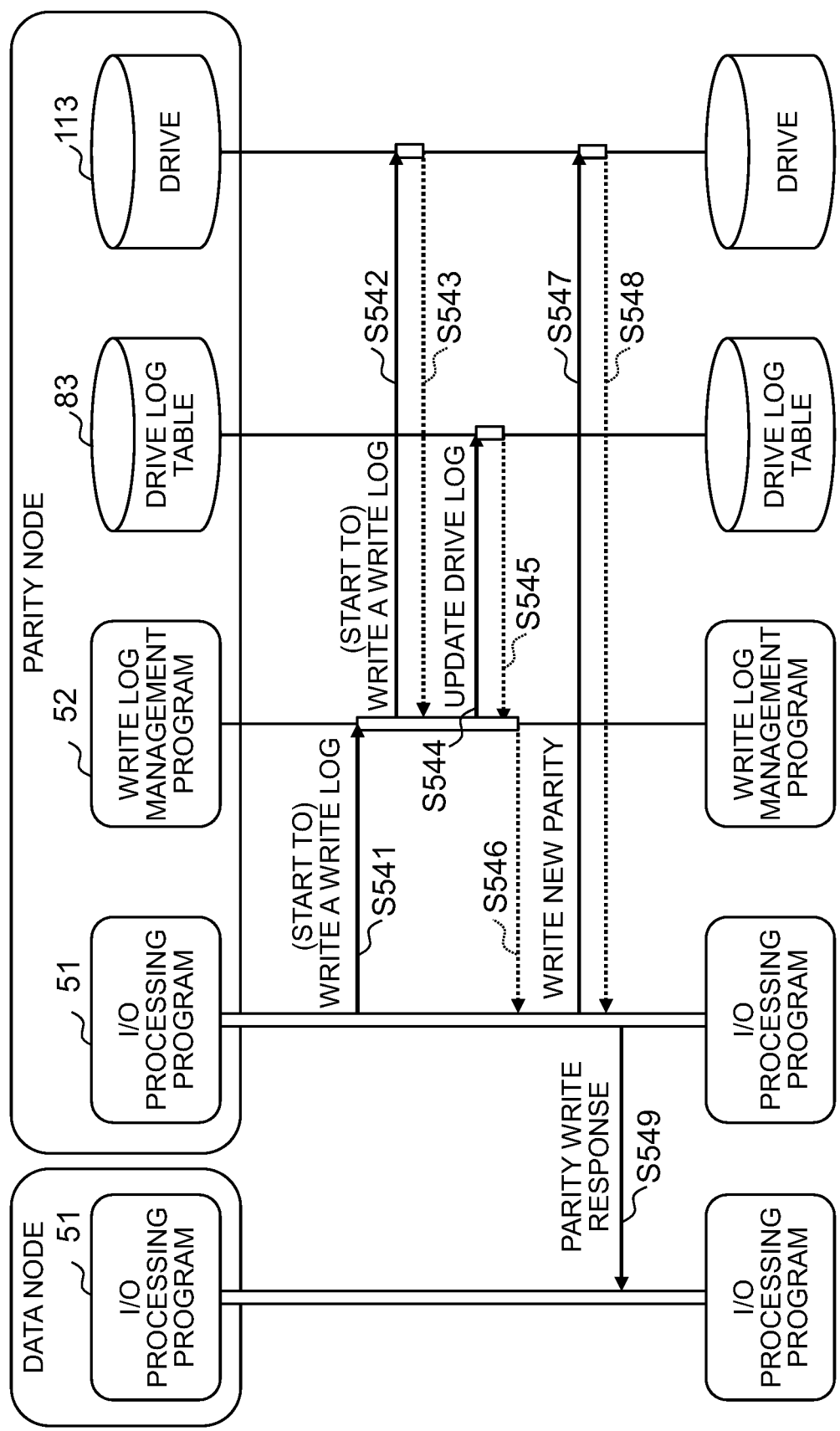
FIG. 22 is a third time chart illustrating the processing of the first embodiment.
Figure 23:
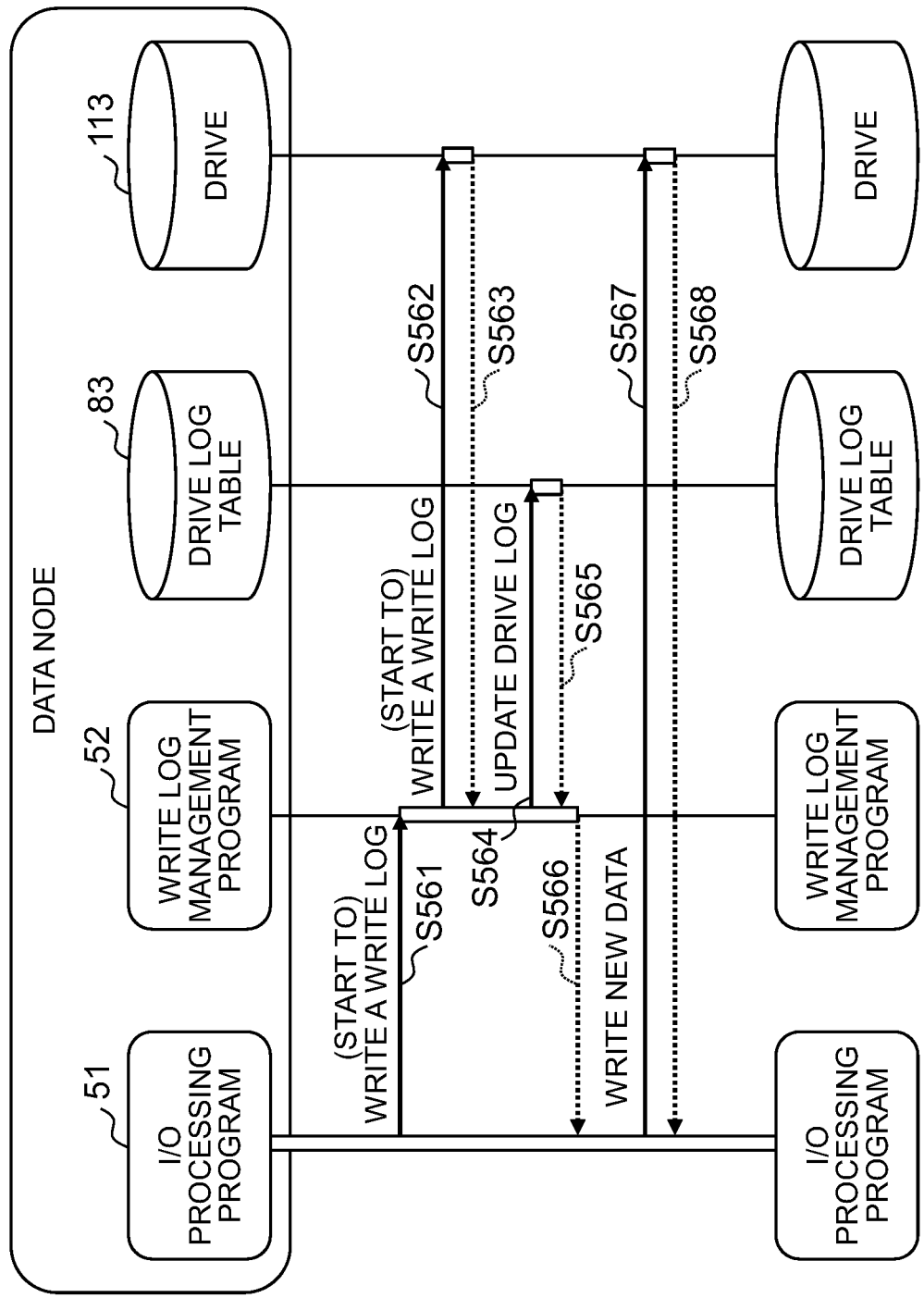
FIG. 23 is a fourth time chart illustrating the processing of the first embodiment.
Figure 24:
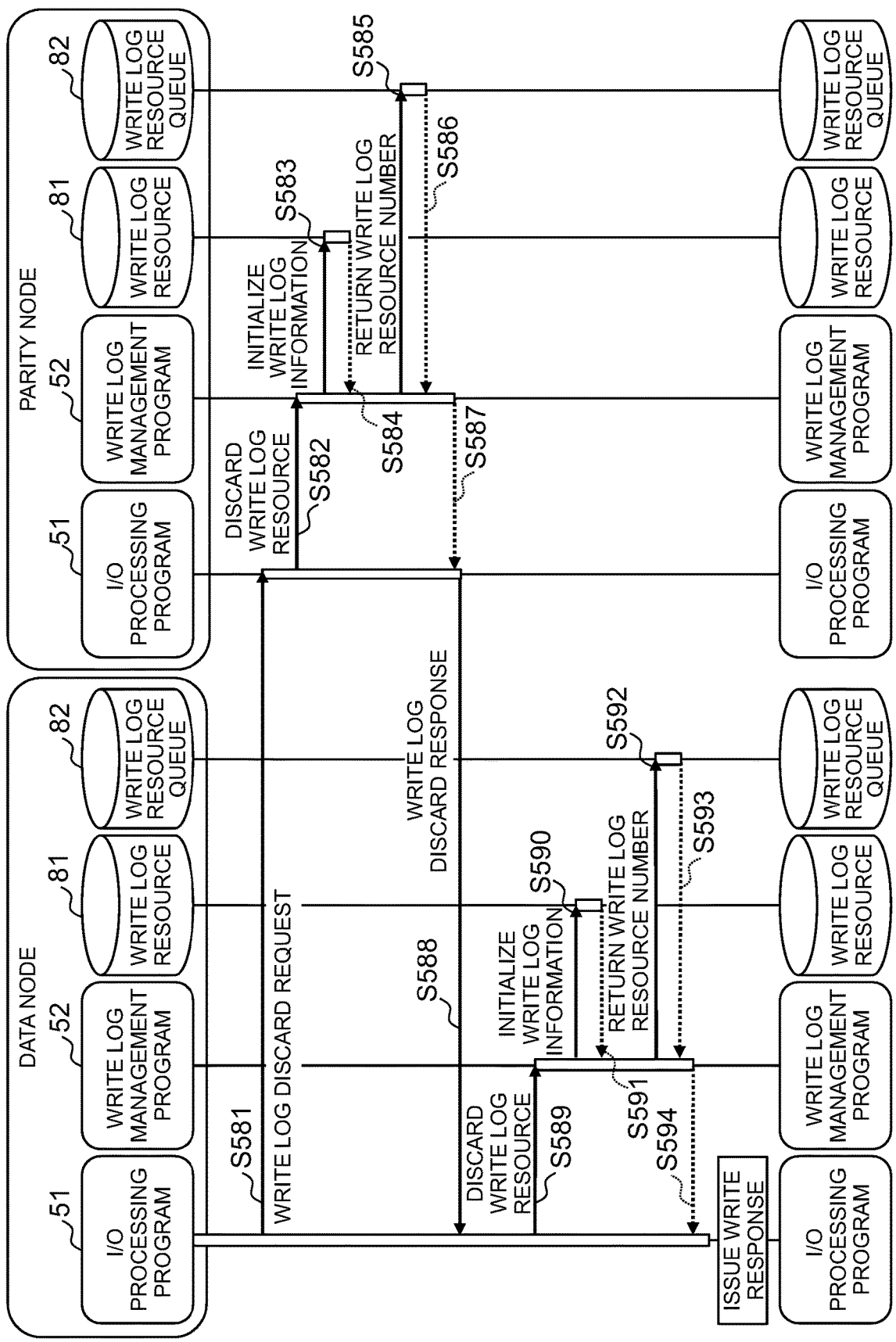
FIG. 24 is a fifth time chart illustrating the processing of the first embodiment.

The entire processing illustrated in FIG. 20 is processing at the data node DN. Therefore, the description indicating that it is the configuration of the data node DN is omitted in the explanation of FIG. 20. The I/O processing program 51 firstly receives a write request from the host controller (S500). Next, the I/O processing program 51 issues an instruction to the write log management program 52 to acquire a write log resource (S501). Processing of the write log management program 52 when receiving this instruction is similar to the processing of the comparison write log management program 52Z illustrated to FIG. 16, so that any detailed explanation about it is omitted. Specifically, processing in S502 to S506 of the write log management program 52 is similar to the processing in S402 to S406 of the comparison write log management program 52Z.

Next, the I/O processing program 51 issues an instruction to the write log management program 52 to check the drive log table 83 and finalize the write log (S507). This processing is significantly different from the comparative example. Having received this instruction, the write log management program 52 checks the drive log table 83 (S508). Specifically, the write log management program 52 checks whether or not any record remains in the drive log table 83 with respect to an area overlapping with the address range of the user area to which data is to be written according to the write request received in S500. However, the write log management program 52 may firstly read the entire drive log table 83 and then judge whether the writing target user area overlaps or not. Only if the write log management program 52 determines that the record(s) remains in the drive log table 83, it performs processing in S510 to S513; and if the write log management program 52 determines that no record remains in the drive log table 83, it notifies the I/O processing program 51 of the completion of the processing without performing the processing in S510 to S513 (S514).

In S510 to S513, the write log management program 52 writes, to the drive 113 and its write log in the drive log table 83, that the writing has already been completed, that is, updates the write log (S510 to S513). Next, the write log management program 52 notifies the I/O processing program 51 of the completion of the processing (S514). Incidentally, the drive log table 83 and the meta area of the drive 113 store the same information as described earlier, but the write log management program 52 reads the drive log table 83 which can be accessed in a short amount of time in S508. Specifically speaking, the write log management program 52 accesses the drive 113 only when necessary to write data, thereby shortening processing time. The explanation will continue by referring to FIG. 21.

The I/O processing program 51 of the data node DN sends a parity write request to the I/O processing program 51 of the parity node PN (S521). Processing of the I/O processing program 51 which has received this request to issue an instruction to acquire the write log resource (S522), and processing of the write log management program 52 to acquire the write log resource are similar to those in FIG. 17, so that any explanation about them is omitted. Specifically, processing in S522 to S527 in FIG. 21 corresponds to the processing in S422 to S427 in FIG. 17. Next, the I/O processing program 51 of the parity node PN issues an instruction to the write log management program 52 of the same parity node PN to check the drive log table 83 and finalize the write log (S528). Processing of the write log management program 52 which has received this instruction (S529 to S535) is the same as that in S508 to S514 in FIG. 20, so that any explanation about it is omitted. The explanation will continue by referring to FIG. 22.

Then, the I/O processing program 51 of the parity node PN issues an instruction to the write log management program 52 of the same parity node PN to record a start write log (S541). Having received this instruction, the write log management program 52 of the parity node PN writes the start write log to the drive log table 83 and the drive 113 (S542 to S545). This write log is written without checking the content of the drive log table 83. This is because recording the write log to start writing cannot be omitted. Once the recording of the start write log is completed, the write log management program 52 of the parity node PN notifies the I/O processing program 51 of the completion (S546). Having received this notice, the I/O processing program 51 of the parity node PN issues an instruction to the drive 113 to write new parity data (S547, S548) and transmits a parity write response to the I/O processing program 51 of the data node DN. The explanation will continue by referring to FIG. 23.

The I/O processing program 51 of the data node DN which has received the parity write response from the parity node PN issues an instruction to the write log management program 52 of the same data node DN to record the start write log (S561). Having received this instruction, the write log management program 52 of the data node DN writes the start write log to the drive log table 83 and the drive 113 (S562 to S565). The writing of this write log is performed without checking the content of the drive log table 83 and cannot be omitted as in the same manner as the processing in the parity node PN. Once the writing of the start write log is completed, the write log management program 52 notifies the I/O processing program 51 of the completion of the processing (S566). Having received this notice, the I/O processing program 51 of the data node DN writes new data to the drive 113 of the data node DN (S567, S568). The series of the processing in S447 to S456 of the comparative example from the writing and the response of the completion write log at the parity node PN, which start from the write log finalization request from the data node DN, to the writing and the response of the completion write log at the data node DN is not executed in the storage system according to the embodiment of the present invention. The explanation will continue by referring to FIG. 24.

Next, the I/O processing program 51 of the data node DN transmits a write log discard request to the I/O processing program 51 of the parity node PN (S581). Processing of the I/O processing program 51 and the write log management program 52 of the parity node PN which has received the write log discard request (S582 to S588) is the same as the processing in S462 to S468 in FIG. 19, so that an explanation about it is omitted. Having received the write log discard response, the I/O processing program 51 of the data node DN issues an instruction to the write log management program 52 of the same data node DN to discard the write log resource. Processing of the write log management program 52 of the data node DN which has received the write log discard request (S590 to S594) is the same as the processing in S470 to S474 in FIG. 19, so that an explanation about it is omitted. Having received the notice of the completion of the write log resource release from the write log management program 52, the I/O processing program 51 of the data node DN transmits a write response, which indicates that the processing in response to the write request received in S500 in FIG. 20 has been completed, to the host controller and terminates the series of the data write processing illustrated in FIG. 20 to FIG. 24.

The following operational advantages can be obtained according to the aforementioned first embodiment.

(1) The storage system 100 includes the computer node(s) 101, the drive(s) 113 which is/are a nonvolatile storage device(s), and the memory 118 which can be accessed at a higher speed than the drive(s) 113. In each of the drives 113, a storage area is divided into a user area for storing user data and a meta area for storing the write log information 85 regarding writing of data to the user data. The write log information 85 includes a plurality of write log records, each of which is a combination of a write range in the user area and a write log status. The write log status indicates at least either "start" indicating that writing data starts or "completed" indicating that writing data is completed. The drive log table 83 including the write log information 85 is recorded in the memory 118. When receiving a write request for write data, the computer node 101 specifies a scheduled write range which is a range of the user area to write the write data and firstly executes the drive log check processing (S313 in FIG. 9) and then executes the data write processing (S315). In the drive log check processing (S313), if a redundant write log record which is the write log record having a write range that at least partly overlaps with the scheduled write range is recorded in the drive log, the computer node 101 changes the write log status of the redundant write log record to "completed" by targeting at the drive log table 83 and the write log information 85 (S322 in FIG. 10) and then proceeds to the data write processing; and if the redundant write log record is not recorded in the drive log, the computer node 101 proceeds to the data write processing without changing the drive log and the write log information (S321 in FIG. 10: NO). In the data write processing, the computer node 101 writes the scheduled write range and the write log record, in which the write log status is "start," to the write log information and the drive log and then writes the write data to the scheduled write range. The computer node 101 does not change the write log status, which is combined with the scheduled write range, to "completed" as processing attributable to the reception of the write request for the write data.

In order to deal with the write hole problem, it may be conceivable to: write the write log record, in which the write log status is "start," to the drive 113 before writing data to the user area; and update the write log status recorded in the drive 113 to "completed" when the writing data to the user area is completed. In this case, the completion of the writing data to the user area can be clearly recorded. However, in order to deal with the write hole problem, the writing data to the meta area always occurs twice every time data is written to the user area. On the other hand, in this embodiment, the write log record to set the write log status to "start" is always written, but the write log record which sets the write log status to "completed" is written only when specific conditions are satisfied. Therefore, in additional processing for solving the write hole problem, the number of writing data to the drive 113 can be reduced. Particularly, if the space for the user data is sufficiently large for the quantity of the write log resources, in most cases the redundant write log record is not recorded in the drive log and writing to change the write log state to "complete" is not made. The reason is that the write log records are likely to be overwritten by other write log records for writing to other areas before the duplicate areas are written to.

(2) The storage system 100 includes a plurality of computer nodes 101 including drives 113. When the data node DN which is a computer node 101 receives a write request for write data form the host controller, it further transmits the write request for the write data to the parity node PN which is another computer node 101 (S521 in FIG. 21). Therefore, it is possible to further enhance the reliability and the availability by using the plurality of computer nodes 101.

(3) The quantity of the write log records included in the drive log and the quantity of the write log records included in the write log information are set on the basis of a maximum simultaneous write quantity in the storage system. For example, the quantity of the write log resources and the quantity of the write log records included in the write log information are set to twice as large as the maximum simultaneous I/O quantity in the storage system 100 and the quantity of the write log records included in the drive log is set to a quantity obtained by multiplying twice the maximum simultaneous I/O quantity by the quantity of the drives 113 included in the computer node 101. Therefore, it is possible to increase frequency of overwriting write log records and reduce the opportunity to change the recorded write log status of the drive 113 to "completed."

(4) A plurality of write log resources for accessing respectively different areas which do not overlap with each other are set in the meta area. The computer node 101 occupies the write log resources and writes the write log record to the meta area. Therefore, a plurality of processing is prevented from simultaneously accessing the same meta area.

(Variation 1) In the aforementioned first embodiment, the data node DN and the parity node PN are different computer nodes 101. However, the same computer node 101 may operate as the data node DN and the parity node PN.

The following operational advantage can be obtained according to this variation.

(5) When the computer node 101 receives the write request, the write data and the write log record are recorded in two or more drives 113 and the write range is a write range of the user data recorded in the same drive 113. Therefore, even in mirroring which is closed to a single computer node 101, the number of writing of data to the drive 113 can be reduced in the additional processing for solving the write hole problem.

In each of the aforementioned embodiments and variations, the configuration of functional blocks is just an example. Some functional configurations which are indicated as separate functional blocks may be configured integrally or the configuration expressed as one functional block diagram may be divided into two or more functions. Moreover, part of the function of each functional block may be formed as a configuration possessed by another functional block.

Each of the aforementioned embodiments and variations has described that programs are stored in the memory 118; however, the programs may be stored in a nonvolatile storage device. Furthermore, the computer node 101 may include an input-output interface which is not illustrated in the drawings; and the programs may be read from other apparatuses via the input-output interface and a medium which can be used by the aforementioned nonvolatile storage device whenever necessary. The medium herein mentioned means, for example, a storage medium which is attachable to, or detachable from, the input-output interface, a communication medium, i.e., a wired, wireless, or optical network, or a carrier wave or a digital signal which propagates over the network. Furthermore, some or all of the functions implemented by the programs may be implemented by a hardware circuit or an FPGA.

The respective embodiments and variations described above may be combined with each other. The various embodiments and variations have been described above, but the present invention is not limited to the content of these embodiments and variations. Other aspects which can be thought of within the scope of the technical idea of the present invention are also included in the scope of the present invention.

REFERENCE SIGNS LIST

100: storage system
51: I/O processing program
52: write log management program
81: write log resource table
82: write log resource queue
83: drive log table
84: hash table
85: write log information
101: computer node
118: memory
119: processor

The invention claimed is:

1. A storage system comprising a computer, a nonvolatile storage device, and a high-speed storage device which can be accessed at a higher speed than the storage device,
   wherein in each of the storage devices, a storage area is divided into a user area for storing user data and a meta area for storing write log information regarding writing of data to the user data;
   wherein the write log information includes a plurality of write log records, each of which is a combination of a write range of the user data in the user area and a write log status;
   wherein the write log status indicates at least either "start" indicating that writing data starts or "completed" indicating that writing data is completed;
   wherein a drive log including the write log information is recorded in the high-speed storage device;
   wherein when receiving a write request for write data, the computer specifies a scheduled write range which is a range of the user area to write the write data and firstly executes drive log check processing and then executes data write processing;
   wherein in the drive log check processing, if a redundant write log record which is the write log record having a write range that at least partly overlaps with the scheduled write range is recorded in the drive log, the computer changes the write log status of the redundant write log record to "completed" by targeting at the drive log and the write log information and then proceeds to the data write processing; and if the redundant write log record is not recorded in the drive log, the computer proceeds to the data write processing without changing the drive log and the write log information;
   wherein in the data write processing, the computer writes the scheduled write range and the write log record, in which the write log status is "start," to the write log information and the drive log and then writes the write data to the scheduled write range; and
   wherein the computer does not change the write log status, which is combined with the scheduled write range, to "completed" as processing attributable to the reception of the write request for the write data.

2. The storage system according to claim 1,
   wherein when the computer receives the write request, the write data and the write log record are recorded in two or more of the storage devices which are stored in the computer; and
   wherein the write range is a write range of the user data recorded in the same storage device.

3. The storage system according to claim 1,
   wherein the computer including the storage device is included in plurality; and
   wherein when receiving the write request for the write data from host controller, the computer further transmits the write request for the write data to the other computer.

4. The storage system according to claim 1,
   wherein a quantity of the write log records included in the drive log and a quantity of the write log records included in the write log information are set on the basis of a maximum simultaneous write quantity in the storage system.

5. The storage system according to claim 1,
wherein a plurality of write log resources for accessing respectively different areas which do not overlap with each other are set in the meta area; and
wherein the computer occupies the write log resources and writes the write log record to the meta area.

6. A storage management method executed by a processor in a storage system comprising the processor, a nonvolatile storage device, and a high-speed storage device which can be accessed at a higher speed than the storage device,
wherein in each of the storage devices, a storage area is divided into a user area for storing user data and a meta area for storing write log information regarding writing of data to the user data;
wherein the write log information includes a plurality of write log records, each of which is a combination of a write range of the user data in the user area and a write log status;
wherein the write log status indicates at least either "start" indicating that writing data starts or "completed" indicating that writing data is completed;
wherein a drive log including the write log information is recorded in the high-speed storage device;
wherein the storage management method comprises, when receiving a write request for write data, causing the processor to specify a scheduled write range which is a range of the user area to write the write data and firstly execute drive log check processing and then execute data write processing;
wherein in the drive log check processing, if a redundant write log record which is the write log record having a write range that at least partly overlaps with the scheduled write range is recorded in the drive log, the processor changes the write log status of the redundant write log record to "completed" by targeting at the drive log and the write log information and then proceeds to the data write processing; and if the redundant write log record is not recorded in the drive log, the processor proceeds to the data write processing without changing the drive log and the write log information;
wherein in the data write processing, the processor writes the scheduled write range and the write log record, in which the write log status is "start," to the write log information and the drive log and then writes the write data to the scheduled write range; and
wherein the processor does not change the write log status, which is combined with the scheduled write range, to "completed" as processing attributable to the reception of the write request for the write data.

7. A storage management program executed in a storage system comprising a processor, a nonvolatile storage device, and a high-speed storage device which can be accessed at a higher speed than the storage device,
wherein in each of the storage devices, a storage area is divided into a user area for storing user data and a meta area for storing write log information regarding writing of data to the user data;
wherein the write log information includes a plurality of write log records, each of which is a combination of a write range of the user data in the user area and a write log status;
wherein the write log status indicates at least either "start" indicating that writing data starts or "completed" indicating that writing data is completed;
wherein a drive log including the write log information is recorded in the high-speed storage device;
wherein the storage management program includes, when the storage system receives a write request for write data, causing the processor to specify a scheduled write range which is a range of the user area to write the write data and firstly execute drive log check processing and then execute data write processing;
wherein in the drive log check processing, if a redundant write log record which is the write log record having a write range that at least partly overlaps with the scheduled write range is recorded in the drive log, the processor is caused to change the write log status of the redundant write log record to "completed" by targeting at the drive log and the write log information and then proceed to the data write processing; and if the redundant write log record is not recorded in the drive log, the processor is caused to proceed to the data write processing without changing the drive log and the write log information;
wherein in the data write processing, the processor is caused to write the scheduled write range and the write log record, in which the write log status is "start," to the write log information and the drive log and then write the write data to the scheduled write range; and
wherein the processor is not caused to change the write log status, which is combined with the scheduled write range, to "completed" as processing attributable to the reception of the write request for the write data.

* * * * *